(12) United States Patent
Erhart et al.

(10) Patent No.: US 9,400,911 B2
(45) Date of Patent: Jul. 26, 2016

(54) FINGERPRINT SENSOR AND INTEGRATABLE ELECTRONIC DISPLAY

(75) Inventors: Richard Alexander Erhart, Tempe, AZ (US); Richard Brian Nelson, Chandler, AZ (US); Paul Wickboldt, Walnut Creek, CA (US)

(73) Assignee: Synaptics Incorporated, San Jose, CA (US)

(*) Notice: Subject to any disclaimer, the term of this patent is extended or adjusted under 35 U.S.C. 154(b) by 674 days.

(21) Appl. No.: 13/099,983

(22) Filed: May 3, 2011

(65) Prior Publication Data
US 2011/0267298 A1  Nov. 3, 2011

Related U.S. Application Data

(63) Continuation-in-part of application No. 12/914,812, filed on Oct. 28, 2010, and a continuation-in-part of application No. 12/916,000, filed on Oct. 29, 2010.

(60) Provisional application No. 61/256,908, filed on Oct. 30, 2009.

(51) Int. Cl.
*H04N 7/18* (2006.01)
*G06K 9/00* (2006.01)
(Continued)

(52) U.S. Cl.
CPC .......... *G06K 9/00026* (2013.01); *G06F 1/1626* (2013.01); *G06F 1/1684* (2013.01); *G06F 1/1696* (2013.01); *G06F 3/041* (2013.01); *G06F 21/32* (2013.01); *G06F 21/83* (2013.01); *G06K 9/00053* (2013.01); *G06F 2203/0338* (2013.01)

(58) Field of Classification Search
CPC .... G06K 9/74; G01B 11/022; G07C 9/00158; G08B 13/19602; G08B 13/19652; G06F 3/044; G06F 3/0482; G06F 3/0488; G06F 1/1601; G06F 3/041
USPC ................................... 348/161; 382/124–127
See application file for complete search history.

(56) References Cited

U.S. PATENT DOCUMENTS 4,151,512 A  4/1979  Rigannati et al.
4,310,827 A  1/1982  Asi
(Continued)

FOREIGN PATENT DOCUMENTS

DE  2213813 A1  10/1973
EP  1018697 A2  7/2000
(Continued)

OTHER PUBLICATIONS

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

(Continued)

*Primary Examiner* — Andy Rao
*Assistant Examiner* — Jared Walker
(74) *Attorney, Agent, or Firm* — Leydig, Voit & Mayer, LTD

(57) ABSTRACT

A fingerprint sensor which includes a conductive layer which is incorporatable within an electronic display is disclosed. The fingerprint sensor also includes a controller coupled to the conductive layer to capture a fingerprint image and can further be adapted to control the display.

31 Claims, 16 Drawing Sheets

(51) Int. Cl.
  *G06F 1/16* (2006.01)
  *G06F 3/041* (2006.01)
  *G06F 21/32* (2013.01)
  *G06F 21/83* (2013.01)

(56) References Cited

U.S. PATENT DOCUMENTS

| | | | |
|---|---|---|---|
| 4,353,056 A | 10/1982 | Tsikos | |
| 4,405,829 A | 9/1983 | Rivest et al. | |
| 4,525,859 A | 6/1985 | Bowles et al. | |
| 4,550,221 A | 10/1985 | Mabusth | |
| 4,580,790 A | 4/1986 | Doose | |
| 4,758,622 A | 7/1988 | Gosselin | |
| 4,817,183 A | 3/1989 | Sparrow | |
| 5,076,566 A | 12/1991 | Kriegel | |
| 5,109,427 A | 4/1992 | Yang | |
| 5,140,642 A | 8/1992 | Hsu et al. | |
| 5,305,017 A | 4/1994 | Gerpheide | |
| 5,319,323 A | 6/1994 | Fong | |
| 5,325,442 A | 6/1994 | Knapp | |
| 5,420,936 A | 5/1995 | Fitzpatrick et al. | |
| 5,422,807 A | 6/1995 | Mitra et al. | |
| 5,543,591 A | 8/1996 | Gillespie et al. | |
| 5,569,901 A | 10/1996 | Bridgelall et al. | |
| 5,623,552 A | 4/1997 | Lane | |
| 5,627,316 A | 5/1997 | De Winter et al. | |
| 5,650,842 A | 7/1997 | Maase et al. | |
| 5,717,777 A | 2/1998 | Wong et al. | |
| 5,781,651 A | 7/1998 | Hsiao et al. | |
| 5,801,681 A | 9/1998 | Sayag | |
| 5,818,956 A | 10/1998 | Tuli | |
| 5,838,306 A | 11/1998 | O'Connor et al. | |
| 5,852,670 A | 12/1998 | Setlak et al. | |
| 5,864,296 A | 1/1999 | Upton | |
| 5,887,343 A | 3/1999 | Salatino et al. | |
| 5,892,824 A | 4/1999 | Beatson et al. | |
| 5,903,225 A | 5/1999 | Schmitt et al. | |
| 5,920,384 A | 7/1999 | Borza | |
| 5,920,640 A | 7/1999 | Salatino et al. | |
| 5,940,526 A | 8/1999 | Setlak et al. | |
| 5,956,415 A | 9/1999 | McCalley et al. | |
| 5,999,637 A | 12/1999 | Toyoda et al. | |
| 6,002,815 A | 12/1999 | Immega et al. | |
| 6,016,355 A | 1/2000 | Dickinson et al. | |
| 6,052,475 A | 4/2000 | Upton | |
| 6,067,368 A | 5/2000 | Setlak et al. | |
| 6,073,343 A | 6/2000 | Petrick et al. | |
| 6,076,566 A | 6/2000 | Lowe | |
| 6,088,585 A | 7/2000 | Schmitt et al. | |
| 6,098,175 A | 8/2000 | Lee | |
| 6,134,340 A | 10/2000 | Hsu et al. | |
| 6,157,722 A | 12/2000 | Lerner et al. | |
| 6,161,213 A | 12/2000 | Lofstrom | |
| 6,182,076 B1 | 1/2001 | Yu et al. | |
| 6,182,892 B1 | 2/2001 | Angelo et al. | |
| 6,185,318 B1 | 2/2001 | Jain et al. | |
| 6,234,031 B1 | 5/2001 | Suga | |
| 6,259,108 B1 | 7/2001 | Antonelli et al. | |
| 6,289,114 B1 | 9/2001 | Mainguet | |
| 6,307,258 B1 | 10/2001 | Crane et al. | |
| 6,317,508 B1 | 11/2001 | Kramer et al. | |
| 6,320,394 B1 | 11/2001 | Tartagni | |
| 6,327,376 B1 * | 12/2001 | Harkin | 382/124 |
| 6,332,193 B1 | 12/2001 | Glass et al. | |
| 6,333,989 B1 | 12/2001 | Borza | |
| 6,337,919 B1 | 1/2002 | Dunton | |
| 6,346,739 B1 | 2/2002 | Lepert et al. | |
| 6,347,040 B1 | 2/2002 | Fries et al. | |
| 6,360,004 B1 | 3/2002 | Akizuki | |
| 6,362,633 B1 | 3/2002 | Tartagni | |
| 6,392,636 B1 | 5/2002 | Ferrari et al. | |
| 6,399,994 B2 | 6/2002 | Shobu | |
| 6,400,836 B2 | 6/2002 | Senior | |
| 6,401,551 B1 | 6/2002 | Kawahara et al. | |
| 6,408,087 B1 | 6/2002 | Kramer | |
| 6,473,072 B1 | 10/2002 | Comiskey et al. | |
| 6,509,501 B2 | 1/2003 | Eicken et al. | |
| 6,512,381 B2 | 1/2003 | Kramer | |
| 6,539,101 B1 | 3/2003 | Black | |
| 6,580,816 B2 | 6/2003 | Kramer et al. | |
| 6,597,289 B2 | 7/2003 | Sabatini | |
| 6,643,389 B1 | 11/2003 | Raynal et al. | |
| 6,672,174 B2 | 1/2004 | Deconde et al. | |
| 6,738,050 B2 | 5/2004 | Comiskey et al. | |
| 6,741,729 B2 | 5/2004 | Bjorn et al. | |
| 6,757,002 B1 | 6/2004 | Oross et al. | |
| 6,766,040 B1 | 7/2004 | Catalano et al. | |
| 6,785,407 B1 | 8/2004 | Tschudi et al. | |
| 6,838,905 B1 | 1/2005 | Doyle | |
| 6,886,104 B1 | 4/2005 | McClurg et al. | |
| 6,897,002 B2 | 5/2005 | Teraoka et al. | |
| 6,898,299 B1 | 5/2005 | Brooks | |
| 6,924,496 B2 | 8/2005 | Manansala | |
| 6,937,748 B1 | 8/2005 | Schneider et al. | |
| 6,941,001 B1 | 9/2005 | Bolle et al. | |
| 6,941,810 B2 | 9/2005 | Okada | |
| 6,950,540 B2 | 9/2005 | Higuchi | |
| 6,959,874 B2 | 11/2005 | Bardwell | |
| 6,963,626 B1 | 11/2005 | Shaeffer et al. | |
| 6,970,584 B2 | 11/2005 | O'Gorman et al. | |
| 6,980,672 B2 | 12/2005 | Saito et al. | |
| 6,983,882 B2 | 1/2006 | Cassone | |
| 7,020,591 B1 | 3/2006 | Wei et al. | |
| 7,030,860 B1 | 4/2006 | Hsu et al. | |
| 7,042,535 B2 | 5/2006 | Katoh et al. | |
| 7,043,644 B2 | 5/2006 | DeBruine | |
| 7,046,230 B2 | 5/2006 | Zadesky et al. | |
| 7,064,743 B2 | 6/2006 | Nishikawa | |
| 7,099,496 B2 | 8/2006 | Benkley | |
| 7,110,577 B1 | 9/2006 | Tschud | |
| 7,126,389 B1 | 10/2006 | McRae et al. | |
| 7,129,926 B2 | 10/2006 | Mathiassen et al. | |
| 7,136,514 B1 | 11/2006 | Wong | |
| 7,146,024 B2 | 12/2006 | Benkley | |
| 7,146,026 B2 | 12/2006 | Russon et al. | |
| 7,146,029 B2 | 12/2006 | Manansala | |
| 7,194,392 B2 | 3/2007 | Tuken et al. | |
| 7,197,168 B2 | 3/2007 | Russo | |
| 7,200,250 B2 | 4/2007 | Chou | |
| 7,251,351 B2 | 7/2007 | Mathiassen et al. | |
| 7,258,279 B2 | 8/2007 | Schneider et al. | |
| 7,290,323 B2 | 11/2007 | Deconde et al. | |
| 7,308,122 B2 | 12/2007 | McClurg et al. | |
| 7,321,672 B2 | 1/2008 | Sasaki et al. | |
| 7,360,688 B1 | 4/2008 | Harris | |
| 7,379,569 B2 | 5/2008 | Chikazawa et al. | |
| 7,409,876 B2 | 8/2008 | Ganapathi et al. | |
| 7,412,083 B2 | 8/2008 | Takahashi | |
| 7,424,618 B2 | 9/2008 | Roy et al. | |
| 7,447,911 B2 | 11/2008 | Chou et al. | |
| 7,460,697 B2 | 12/2008 | Erhart et al. | |
| 7,463,756 B2 | 12/2008 | Benkley | |
| 7,505,611 B2 | 3/2009 | Fyke | |
| 7,505,613 B2 | 3/2009 | Russo | |
| 7,574,022 B2 | 8/2009 | Russo | |
| 7,643,950 B1 | 1/2010 | Getzin et al. | |
| 7,646,897 B2 | 1/2010 | Fyke | |
| 7,681,232 B2 | 3/2010 | Nordentoft et al. | |
| 7,751,601 B2 | 7/2010 | Benkley | |
| 7,843,438 B2 | 11/2010 | Onoda | |
| 7,953,258 B2 | 5/2011 | Dean et al. | |
| 8,005,276 B2 | 8/2011 | Dean et al. | |
| 8,335,353 B2 | 12/2012 | Yamamoto et al. | |
| 2001/0026636 A1 | 10/2001 | Mainget | |
| 2001/0030644 A1 | 10/2001 | Allport | |
| 2001/0033275 A1 * | 10/2001 | Kent et al. | 345/173 |
| 2001/0036299 A1 | 11/2001 | Senior | |
| 2001/0043728 A1 | 11/2001 | Kramer et al. | |
| 2002/0025062 A1 | 2/2002 | Black | |
| 2002/0067845 A1 | 6/2002 | Griffis | |
| 2002/0073046 A1 | 6/2002 | David | |
| 2002/0089044 A1 | 7/2002 | Simmons et al. | |
| 2002/0089410 A1 | 7/2002 | Janiak et al. | |
| 2002/0096731 A1 | 7/2002 | Wu et al. | |

(56) References Cited

U.S. PATENT DOCUMENTS

| | | |
|---|---|---|
| 2002/0122026 A1 | 9/2002 | Bergstrom |
| 2002/0126516 A1 | 9/2002 | Jeon |
| 2002/0133725 A1 | 9/2002 | Roy et al. |
| 2002/0174348 A1 | 11/2002 | Ting |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063445 A1 | 4/2003 | Fischbach et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen et al. |
| 2003/0169228 A1 | 9/2003 | Mathiassen et al. |
| 2003/0174256 A1 | 9/2003 | Kim et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0101171 A1 | 5/2004 | Lane et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1* | 12/2004 | Lan et al. .................. 382/124 |
| 2005/0030724 A1 | 2/2005 | Ryhanen et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0136200 A1 | 6/2005 | Durell et al. |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0017862 A1* | 1/2006 | Song et al. .................. 349/42 |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0097991 A1 | 5/2006 | Hotelling et al. |
| 2006/0110537 A1 | 5/2006 | Huang et al. |
| 2006/0140461 A1 | 6/2006 | Kim et al. |
| 2006/0144953 A1 | 7/2006 | Takao |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0038867 A1 | 2/2007 | Verbauwhede et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086630 A1 | 4/2007 | Setlak et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2007/0253607 A1 | 11/2007 | Higuchi |
| 2008/0002867 A1 | 1/2008 | Mathiassen et al. |
| 2008/0006453 A1* | 1/2008 | Hotelling .................. 178/18.06 |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0238878 A1 | 10/2008 | Wang |
| 2008/0240523 A1 | 10/2008 | Benkley et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2009/0083850 A1 | 3/2009 | Fadell et al. |
| 2009/0153297 A1 | 6/2009 | Gardner |
| 2009/0154779 A1 | 6/2009 | Satyan |
| 2009/0155456 A1 | 6/2009 | Benkley et al. |
| 2009/0169071 A1 | 7/2009 | Bond et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0272329 A1 | 10/2010 | Benkley |
| 2010/0284565 A1 | 11/2010 | Benkley et al. |

(56) References Cited

U.S. PATENT DOCUMENTS

| | | |
|---|---|---|
| 2011/0002461 A1 | 1/2011 | Erhart et al. |
| 2011/0032205 A1 | 2/2011 | David |
| 2011/0102567 A1 | 5/2011 | Erhart |
| 2011/0102569 A1 | 5/2011 | Erhart |
| 2011/0165393 A1 | 7/2011 | Bayne et al. |
| 2011/0267298 A1 | 11/2011 | Erhart et al. |
| 2012/0242635 A1 | 9/2012 | Erhart et al. |
| 2013/0108124 A1 | 5/2013 | Wickboldt et al. |
| 2013/0169590 A1 | 7/2013 | Wickboldt et al. |
| 2013/0259329 A1 | 10/2013 | Wickboldt et al. |
| 2013/0265137 A1 | 10/2013 | Nelson et al. |

FOREIGN PATENT DOCUMENTS

| | | |
|---|---|---|
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| JP | 04158434 A2 | 6/1992 |
| TW | I328776 B | 12/2006 |
| TW | 200828131 A | 7/2008 |
| TW | I315852 B | 10/2009 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 02/093239 A1 | 11/2002 |
| WO | WO 02/099520 A1 | 12/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |
| WO | WO 2005/106774 A2 | 11/2005 |
| WO | WO 2005/106774 A3 | 11/2005 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2011/053797 | 5/2011 |

OTHER PUBLICATIONS

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] pp. 127-134, paragraph 6.2.

Gassend, et al., "Controlled Physical Random Functions", In Proceedings of the 18th Annual Computer Security Conference, Las Vegas, Nevada, Dec. 12, 2002.

bellagiodesigns.com (Internet Archive Wayback Machine, www.bellagiodesigns.com date: Oct. 29, 2005).

Matsumoto et al., Impact of Artificial "Gummy" Fingers on Fingerprint Systems, SPIE 4677 (2002), reprinted from cryptome.org.

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

\* cited by examiner

FINGERPRINT SENSOR AND INTEGRATABLE ELECTRONIC DISPLAY

CROSS-REFERENCE

This application is a continuation-in-part application of Ser. No. 12/914,812 filed Oct. 28, 2010, entitled "Integrated Fingerprint Sensor and Display" which claims the benefit of U.S. Provisional Patent Application Ser. No. 61/256,908 filed Oct. 30, 2009, entitled "Systems and Methods for Sensing Finger Prints Through a Display," this application is also a continuation-in-part application of Ser. No. 12/916,000 filed Oct. 29, 2010, entitled "Systems and Methods for Sensing Finger Prints Through a Display" which claims the benefit of U.S. Provisional Patent Application Ser. No. 61/256,908 filed Oct. 30, 2009, entitled "Systems and Methods for Sensing Finger Prints Through a Display," each of which are incorporated herein by reference in its entirety.

BACKGROUND OF THE INVENTION

Since its inception, fingerprint sensing technology has revolutionized biometric identification and authentication processes. In most cases, a single fingerprint can be used to uniquely identify an individual in a manner that cannot be easily replicated or imitated. The ability to capture and store fingerprint image data in a digital file of minimal size has yielded immense benefits in fields such as law enforcement, forensics, and information security.

However, the widespread adoption of fingerprint sensing technology in a broad range of applications has faced a number of obstacles. Among these obstacles is the need for a separate and distinct apparatus for capturing a fingerprint image. Additionally, such components are often impractical for use in systems that are designed to be of minimal size or weight. As handheld devices begin to take on a greater range of functionality and more widespread use, engineers and designers of such devices are constantly seeking ways to maximize sophistication and ease of use while minimizing size and cost. Typically, such devices only incorporate input/output components that are deemed to be essential to core functionality, e.g., a screen, and a limited set of buttons.

For these reasons, fingerprint-based authentication techniques have not replaced username and password authentication in the most common information security applications such as email, online banking, and social networking. Paradoxically, the growing amount of sensitive information Internet users are entrusting to remote computer systems has intensified the need for authentication procedures more reliable than password-based techniques.

A display with built-in fingerprint sensing capability would thus lead to increased adoption of fingerprint-based authentication. However, a problem with simply integrating existing fingerprint sensing technology into electronic devices is hardware incompatibility. Most fingerprint sensors require a silicon circuit on which to mount the fingerprint sensing components. Incorporating such a circuit, whether resistive, capacitive, thermal, or optical, into a display would require significant and costly modifications to the design and production processes of such displays.

As will be seen, the present disclosure provides such a system that overcomes these obstacles.

SUMMARY OF THE INVENTION

An aspect of the disclosure is directed to a sensor comprising: a sensor positionable within 150 microns of an uppermost surface of an electronic device display; and a controller coupled to the sensor to capture a fingerprint image wherein the controller is positionable underneath a lower surface of the electronic device display; further wherein the sensor is integrated into the electronic device display between a cover lens and a protective layer. Additionally, the sensor can be adaptable and configurable such that the electronic display further comprises a touch sensor. Moreover, the touch sensor can be configured such that it is controllable by a touch sensor controller. In another aspect, the controller coupled to the sensor can further be coupled to a touch sensor. In at least some configurations, a mask layer is provided. The mask layer can be positioned such that it has an upper surface adjacent the protective layer. Additionally, the conductive layer can be positioned such that it is disposed on a bottom surface of a mask layer and positioned on a lower surface of the protective layer. The mask layer can further include an indication, such as an aperture in the mask, of a fingerprint sensing area. In some aspects one or more controllers can be provided and further can be, but is not limited to, a chip-on-flex configuration. Additionally, the sensor can be configured such that it comprises at least one conductive layer. Conductive layers can be formed from materials selected from one or more of indium tin oxide, carbon nanotubes, metal nanowires, conductive transparent polymers and fine line metal. Additionally, the conductive layer can be formed from a flexible material. In at least some configurations, or more of each of a planarization layer, an optical coating, an optically clear adhesive, a clear plastic film, and a hard coat can be provided. Suitable material for the protective layer is selected from the group comprising ultra thin glass and polyethylene terephthalate. Furthermore, in at least some configurations, a hard coating is applied to the protective layer. Additionally, the fingerprint sensor can further be configurable to comprise a conductive layer and the touch sensor can be configurable to further comprise a conductive layer and further wherein the conductive layer of the fingerprint sensor and the conductive layer of the touch sensor are integrally formed.

Yet another aspect of the disclosure provides for an electronic display. The electronic display is configurable to comprise: an electronic display module configured to produce a visible display; a protective layer located above the electronic display module and configured to durably receive a user's finger surface; a fingerprint sensor; and a controller coupled to the fingerprint sensor to capture a fingerprint image when a user's fingerprint is sensed. A motion sensor can be provided for detecting a motion of a finger on the fingerprint sensor. Additionally, a display controller can be provided that is coupleable to the display module and configurable to control the visible display of the display module. The display controller can be configured such that it is coupleable to the fingerprint sensor such that the controller controls the fingerprint sensor. In at least some configurations a single controller can be provided which is configured to control more than one aspect of the electronic display. The fingerprint sensor can further comprise a conductive layer disposed under a mask layer on the bottom surface of the protective layer. The mask layer can be configured such that it includes an identification of a fingerprint sensing area, such as an aperture in the mask. Additionally, the controller can be a chip-on-flex in some configurations. The sensor comprises at least one conductive layer. The conductive layer can be selected from one or more of indium tin oxide, carbon nanotubes, metal nanowires, conductive transparent polymers and fine line metal. In at least some configurations, the conductive layer is a flexible material. Additionally, one or more of each of a planarization layer, an optical coating, an optically clear adhesive, a clear plastic film, and a hard coat can be provided. Moreover, the protective layer can be selected from the group comprising ultra thin glass and polyethylene terephthalate. In at least some configurations, a hard coating is applied to the protective layer. Additionally, the display can further comprise a touch sensor. In at least some aspects, the fingerprint sensor further comprises a conductive layer and the touch sensor further comprises a conductive layer and further wherein the conductive layer of the fingerprint sensor and the conductive layer of the touch sensor are integrally formed. The devices can be integrally formed with the fingerprint sensor such that the overall component possesses everything needed to operate. As will be appreciated by those skilled in the art, this can be achieved by forming a one piece component or by forming components that act in a unified manner when constructed.

An additional aspect of the disclosure is directed to a method of assembling an electronic display. The method of assembling the device comprises: providing a printed circuit board; mounting a display controller on the printed circuit board; mounting an display module above the printed circuit board; positioning a fingerprint sensor circuitry on upper side of the display module, wherein the fingerprint sensor is positioned within 150 microns of an uppermost surface of the electronic display; and applying a protective cover to the uppermost surface of the electronic display, wherein the protective cover is positioned over the fingerprint sensor circuitry. In at least some aspects, the method can further comprise one or more of the steps of: applying a mask layer between the protective cover and the display; and mounting a user protective surface above the mask layer. The display controller can be configurable to control one or more aspects of the device including, for example, the motion sensor and the fingerprint sensor. In at least some aspects, the method can include the step of connecting the display controller to the motion sensor and the fingerprint sensor, and/or mounting a fingerprint sensor controller on the printed circuit board. Additionally, the step of mounting the fingerprint sensor controller can further include connecting the display controller to the motion sensor circuitry and connecting the fingerprint sensor controller to the fingerprint sensor circuitry.

Yet another aspect of the disclosure is directed to a method of authenticating biometric information. A method according to the disclosure comprises: identifying a sensor positionable within 150 microns of an uppermost surface of an electronic device display, and a controller coupled to the sensor to capture a fingerprint image wherein the controller is positionable underneath a lower surface of the electronic device display, further wherein the sensor is integrated into the electronic device display between a cover lens and a protective layer; sensing biometric information associated with a user; comparing the sensed biometric information with a biometric template associated with the user; if the biometric information matches the biometric template, receiving credentials associated with the user based on the biometric information, and communicating credentials to a requesting process. Additionally, aspects of the disclosure include: identifying a sensor positionable within 150 microns of an uppermost surface of an electronic device display, and a controller coupled to the sensor to capture a fingerprint image wherein the controller is positionable underneath a lower surface of the electronic device display, further wherein the sensor is integrated into the electronic device display between a cover lens and a protective layer; identifying a biometric device installed in a client device with a web-enabled application; identifying biometric information associated with a user; creating a biometric template associate with the biometric information; receiving user credentials associated with the user; and binding the user credentials with the biometric template.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
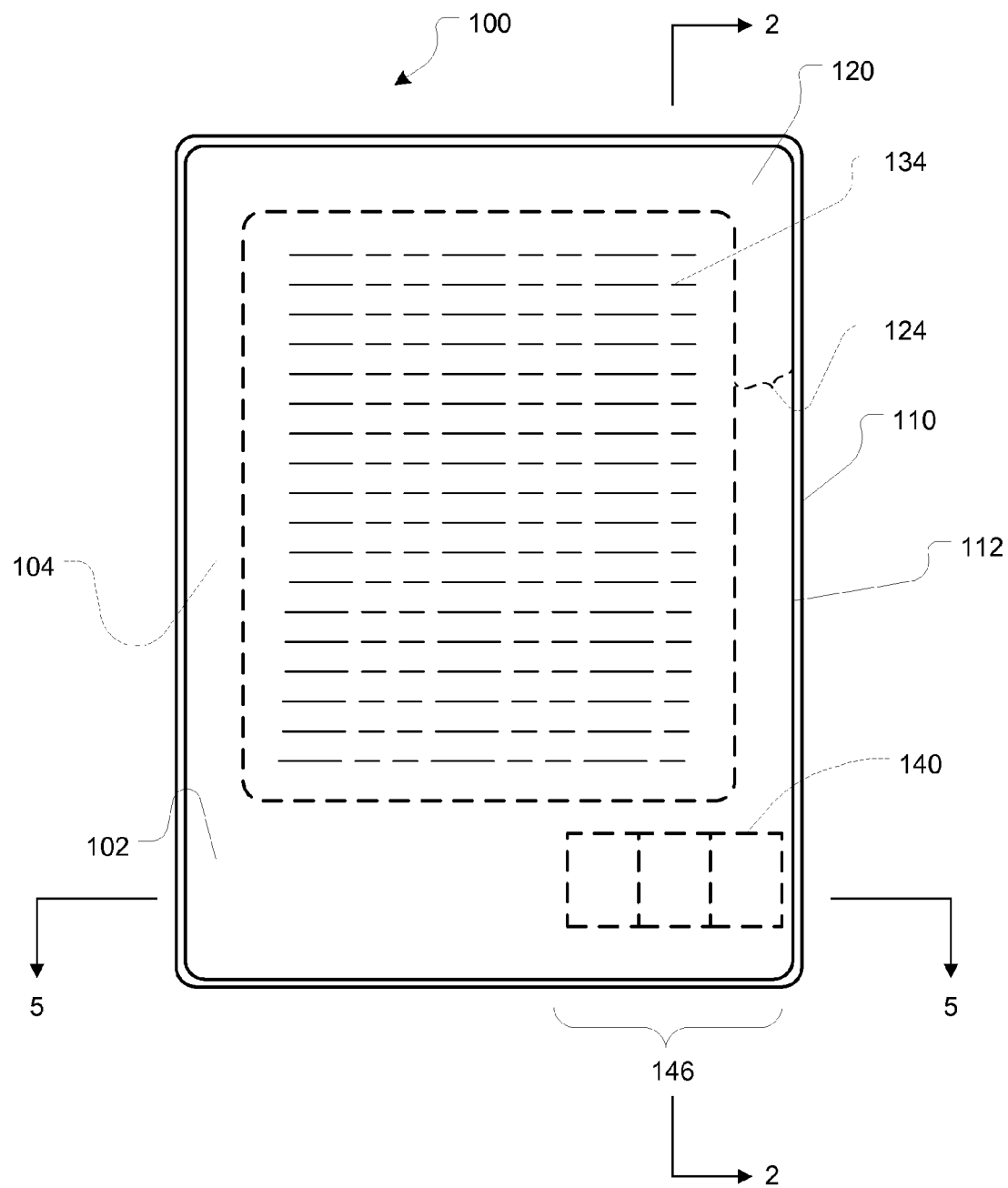
FIGS. 1a-b are top views of electronic devices having a display.

A variety of electronic displays are used with electronic devices. Displays can operate using either emissive (pixels generate light), transmissive (light transmitted through pixels) and reflective (ambient light reflected) approaches. Display types may include, for example, liquid crystal displays (LCDs) which use liquid crystal cells that change transmission, or reflection in an applied electric field, organic light emitting diode (OLED) devices which utilize a light emitting diode (LED) in which an emissive electroluminescent film of organic compounds emits light in response to an electric current, and different types of electrophoretic displays in which pigmented particles are moved in response to an electric field (e.g. Gyricon, E-ink, etc.). Gyricon is a type of electronic paper developed at Xerox PARC and is a thin layer of transparent plastic in which millions of small beads are randomly disposed. The beads, somewhat line toner particles, are each contained an oil-filled cavity and are free to rotate within those cavities. The beads are bichromal with hemispheres of two contrasting colors and charged such that they exhibit an electrical dipole. When voltage is applied to the surface of the sheet, the beeds rotate to present one of the two colors to the viewer. Thus voltages can be applied to create images such as text and pictures. E-ink is another type of electronic paper manufactured by E Ink Corporation which was acquired by Prime View International.

The LCD panel typically consists of two sheets of glass separated by a sealed-in liquid crystal material. Both sheets have a thin transparent coating of conducting material, with the viewing side etched into segments with leads going to the edge of the display. Voltages applied between the front and back coatings disrupt the orderly arrangement of the molecules sufficiently to darken the liquid and form visible patterns.

Additionally, displays have been developed that can detect the presence and location of touch, e.g., by a finger, or passive object such as a stylus or digital pen, are commonly referred to as a touch screens. Touch screens have become a component of many computer and electronic devices. Many LCD displays are manufactured to include touch screen functionality. Touch screens can be attached or incorporated into to computers, networks, mobile telephones, video games, personal digital assistants (PDA), tablets, or any digital device. A variety of technologies are currently used to produce a device with touch screen capabilities. Technologies that enable touch screen functionality include: resistive touch screen panels; surface acoustic wave technology; capacitive sensing panels (e.g., using surface capacitance technology or projective capacitive touch technology, which uses either mutual capacitive sensors or self-capacitive sensors); infrared; optical imaging; dispersive signal technology; and acoustic pulse recognition. Touch screen functionality can be combined with a display in a device in many configurations. The touch screen sensing circuits can be incorporated directly in or on the layers of the display (using, for example, "in-cell" or "on-cell" approaches), built on a separate substrate which is laminated onto the display (e.g., using an "out-cell" approach), or laminated on a cover lens which protects the display in the device, or the sensing circuits can be incorporated directly on the back-side of this cover lens ("Touch-on-Lens").

As will be appreciated by those skilled in the art, electronic devices can be configured to include a variety of components and features including: a display, a touch screen, a scratch-resistant cover (e.g., lens), storage, a system on a chip, a CPU core, a GPU core, memory, Wi-Fi connectivity (e.g., 902.11 b.g), Bluetooth, connectivity (e.g., USB connector), camera, audio, battery (e.g., built-in, rechargeable lithium-ion polymer battery), power connector, computer readable media, software, etc.

For purposes of illustrating an integrated sensor of the disclosure suitable for detecting a fingerprint, a touch screen display currently employed by, for example, a smart phone is described. Such a touch screen typically comprises a 9 cm (3.5 in) liquid crystal display (LCD) with a scratch-resistant glass layer. The capacitive touch screen of the LCD is typically optimized for a bare finger, or multiple finger multi-touch, sensing. However, as will be appreciated by those skilled in the art, a variety displays as well as a variety of touch screen configurations and touch screen operated devices can be used without departing from the scope of the disclosure.

An LCD touch screen typically is an assembly that includes an LCD, a printed circuit board (PCB) on which input-output (I/O) connections and integrated circuits (ICs) performing various functions are mounted, a transparent touch screen circuit pattern on a transparent substrate, and a protective shield or coating applied on top of the touch screen circuitry. The touch screen circuitry is connected along with the LCD display to the PCB. The touch screen circuitry is typically incorporated into the assembly using one of two methods. In a first method, the touch screen circuitry is incorporated directly into or onto the LCD, then a protective shield or coating (e.g. cover lens) is located above the LCD/Touch screen combination. In a second method, the touch screen circuitry is applied onto the protective coating or shield (e.g. cover lens) and then the resulting structure is mounted above the LCD, with the touch screen circuitry mounted between the protective coating or shield and the LCD. In all cased the PCB is located below the LCD, out of view.

Biometric sensors can include, for example, a fingerprint sensor, a velocity sensor, and an integrated circuit which is electrically connected to the fingerprint sensor and the velocity sensor. Conductive traces of an image sensor and velocity sensor can be etched or otherwise formed on an upper side of a substrate. A protective coating can be applied to the upper surface of the substrate, over the image sensor and velocity sensor to provide electrical isolation and mechanical protection of the sensors. Alternatively, conductive traces of an image sensor can be formed on a bottom-side of a substrate, wherein the substrate can act as a protective coating and can be further improved with a hard coating applied to the upper surface. Further details about fingerprint sensor configurations are contained in, for example, U.S. Pat. No. 7,751,601 to Benkley III for "Fingerprint Sensing Assemblies and Methods of Making"; U.S. Pat. No. 7,099,496 to Benkley III for "Swiped Aperture Capacitive Fingerprint Sensing Systems and Methods;" U.S. Pat. No. 7,463,756 to Benkley III for "Finger Position Sensing Methods and Apparatus;" U.S. Pat. No. 7,460,697 to Erhart et al. for "Electronic Fingerprint Sensor with Differential Noise Cancellation;" U.S. Pat. No. 7,146,024 to Benkley III for "Swiped Aperture Capacitive Fingerprint Sensing Systems and Methods;" U.S. Pat. No. 6,400,836 to Senior for "Combined Fingerprint Acquisition and Control Device;" and U.S. Pat. No. 6,941,001 to Bolle for "Combined Fingerprint Acquisition and Control Device."

In the systems disclosed herein, a fingerprint sensor is integrated with a display and is positioned on or adjacent the uppermost surface such that the fingerprint sensor is within about 150 microns of a finger when the finger comes in contact with the uppermost surface of the system. In at least some configurations, the system can be configured such that the finger sensor is within about 100 microns of a finger, or more preferably within 50 microns of a finger, when the finger comes in contact with the uppermost surface of the system. In some configurations, a single chip can be provided that controls one or more of the display, touch screen and the fingerprint sensing functions. Additionally, the fingerprint sensor can be incorporated in such a way that the surface of the device presented to a user is smooth or substantially smooth. Displays and systems can be configured such that they are integrally formed such that they act in a unified manner or such that the completed display or system is comprised of a single component.

FIG. 1 is an electronic device 100 from a top or upper surface view. The device is any suitable electronic device, such as a smart phone, having a device or display interface 120 which a user engages with their finger. Depending upon the nature of the device and display used, the interface 120 can further be comprised of a plurality of parts, as discussed in further detail below.

The device itself has a top surface 102 and a bottom surface 104. Moreover, each component of the device has an upper surface (i.e. a surface that faces the top surface of the device) and a lower surface (i.e. a surface that faces the bottom surface of the device) as will be appreciated from the cross-sectional views. The housing 110 of the electronic device 100 can be configured to form a bezel or rim 112 which secures the interface 120 within the housing 110 of the device 100. A mask 124, such as an ink mask, can be provided which frames at least part of the interface 120. The mask 124 is typically positioned such that it obscures device electronics located within the housing under a portion of the interface 120. For a touch screen enabled interface, a portion of the interface 120 that is not covered by mask 124 has a plurality of touch screen sensors 134. The plurality of touch screen sensors 134 can be any suitable conductor, including a transparent conductor, for example, from a layer of patterned indium tin oxide (ITO), carbon nanotubes, metal nanowires, conductive polymers or fine metal lines (e.g., copper lines). Additionally, a fingerprint sensor 140 adjacent at least one wall of the electronic device 100 and can (as illustrated here), but need not, be positioned in a location where the mask 124 is also present. In another configuration, an aperture can be provided in the mask corresponding to all or part of a location where the fingerprint is sensed. The fingerprint sensor 140 can include a swiping area 146 across which, for example, a user would swipe their fingerprint which is then read by the fingerprint sensor 140.

Figure 1B:
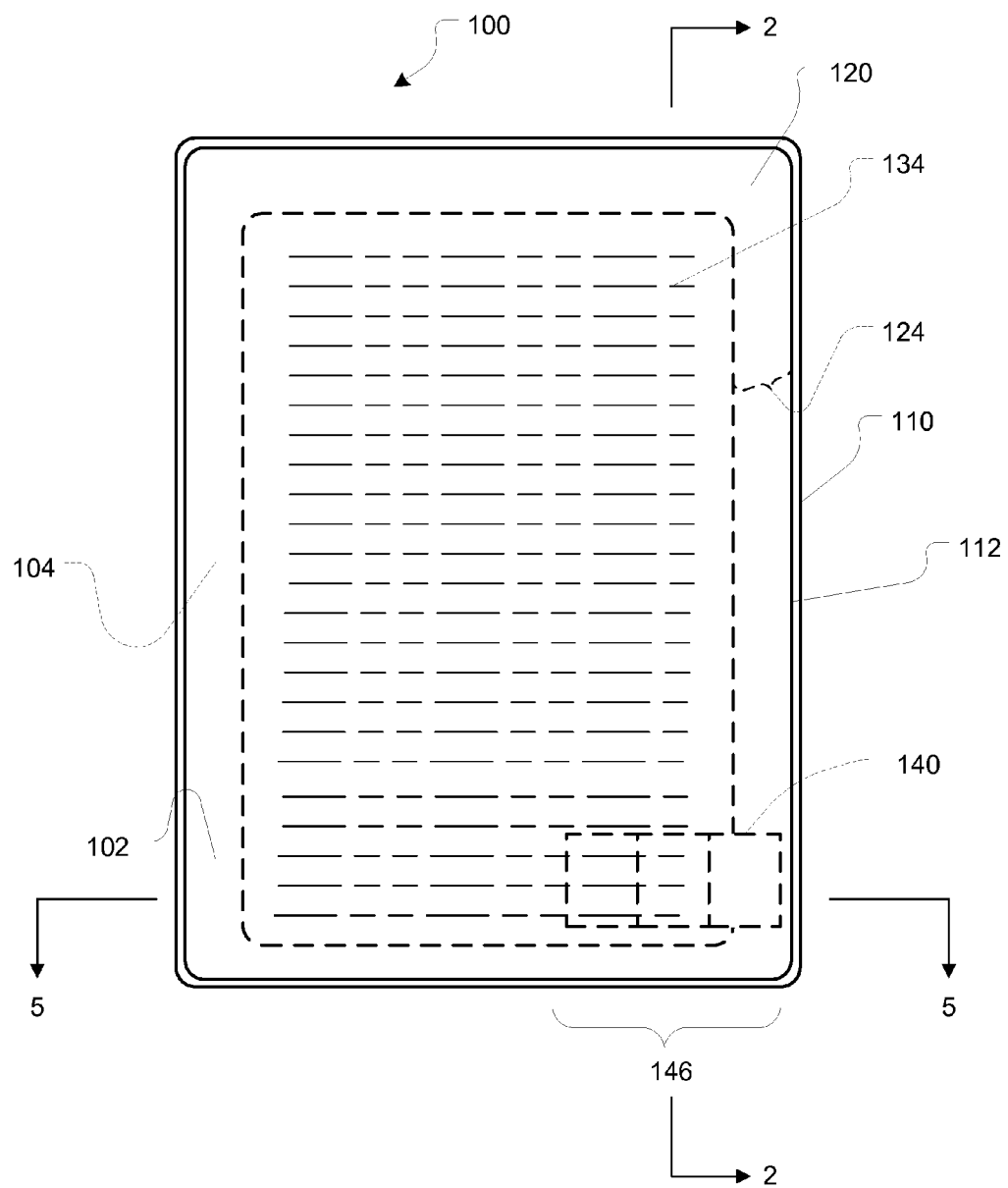

As shown in FIG. 1b the fingerprint sensor 140 is positioned such that it overlays a portion of the touch screen sensor 134. In some configurations, the sensors of the fingerprint sensor 140 and the touch screen sensor 134 are integrally formed such that the sensors are formed as one piece or are formed such that the sensors act in a unified manner with portions of the sensor adapted to function as a touch screen sensor and a subset adapted to function as a fingerprint sensor or a fingerprint sensor and a touch screen sensor.

Figure 2A:
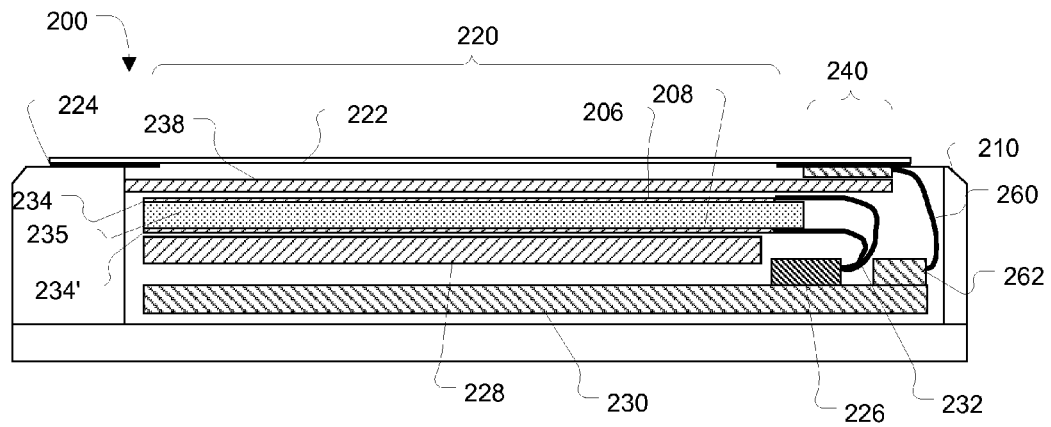
FIGS. 2a-b are cross-sectional views of a the devices of FIG. 1a-b across the lines 2-2 illustrating different fingerprint sensor integrations.
Figure 2B:
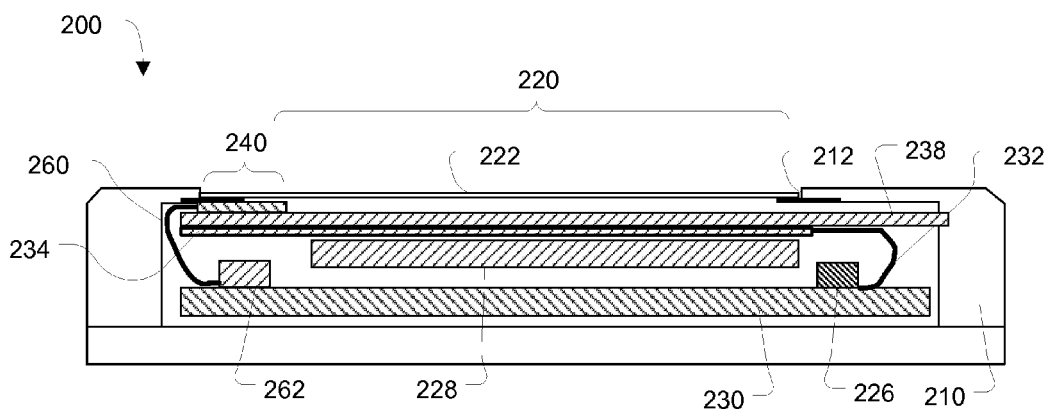

FIGS. 2a-b are cross-sectional views of an electronic device 200, such as device 100 of FIG. 1a, taken along the lines 2-2 of FIGS. 1a-b. Although not exhaustive, two common cross-sectional configurations exist. In a first configuration shown in FIG. 2a, a fingerprint sensor is positioned on a cover lens, below which is a touch sensor, and the remainder of the device, including the display. In the second configuration, shown in FIG. 2b the fingerprint sensor is positioned on top of the cover lens and the touch sensor is built onto the back side (lower side) of the cover lens, with the display and the rest of the device below. As will be appreciated by those skilled in the art, one or more components can be configured into a module. Modules can be configured as separable components, interchangeable with others, for assembly into units of differing size, complexity, or function Electronic device 200 includes a housing 210, a printed circuit board (PCB) 230 and a display 228, such as an LCD or LCD module. The device can also include a touch sensor component 235, such as a glass layer, onto which a conductive layer such as indium tin oxide (ITO) or similar materials are applied to form the touch screen circuitry. The conductive layer can be applied such that it forms a pattern on the surface of the glass layer, as will be appreciated by those skilled in the art. As shown in FIG. 2a, a first conductive layer 234 covers an upper surface 206 of the touch sensor component 253 and a second conductive layer 234' covers a lower surface 208 of the touch sensor component 235. The cover lens 238 can be formed from suitable material including, for example, a chemically hardened glass. A touch circuit controller 226 is coupled to a touch screen circuit or digitizer which can be formed from conductive layers 234, 234' of the touch circuit component 235 via a flexible circuit 232. The controller 226 is mountable on the PCB 230. A display 228 is positioned below the cover lens 238 and above the PCB 230. The display 228 can include, for example, a glass layer as well as any other components required to achieve a functional display including logic devices.

As depicted herein a fingerprint sensor 240 is, but need not be, positioned underneath a mask 224. The sensor 240 is illustrated connected to a fingerprint sensor circuit controller 262 via a flexible connector 260. However, as will be appreciated by those skilled in the art, a single integrated circuit can be configured to control both the touch circuit and the fingerprint sensor without departing from the scope of the disclosure. A protective layer 222, such as a protective glass layer, is positioned over the fingerprint sensor 240 and the display 228.

Fingerprint sensor 240 senses fingerprint characteristics of a finger swiped along the surface of protective layer 222 proximate the fingerprint sensor 240. The protective layer 222 and display layer 228 can be formed from any suitable non-conductive material (e.g., glass, PET or a suitable hard coating). Fingerprint sensor 240 is adapted and configured such that it is capable of sensing ridges and valleys of a user's finger at or within a target distance from the device surface. The target distance is less than 150 microns, more particularly is less than 100 microns, and even more particularly is less than 50 microns.

Turning to FIG. 2b, which illustrates an alternative cross-section of the device shown in FIG. 1a, electronic device 200 includes a housing 210, a PCB 230 and a display module 228. Where touch screen functionality is included, device 200 can also be configured such that the conductive layer 234 is shown as applied to a lower side of cover glass 238. Device 200 further includes a protective layer 222 positioned above cover glass 238. A touch screen circuit controller 226 is coupled to a conductive layer via a flexible circuit or connector 232. A fingerprint sensor controller 262 is coupled to PCB 230 and positioned below display 228. Fingerprint sensor 240 is positioned near the upper surface of the cover lens and is adapted and configured to sense fingerprint characteristics of a finger swiped along the surface of protective layer 222 proximate the fingerprint sensor.

Figure 3:
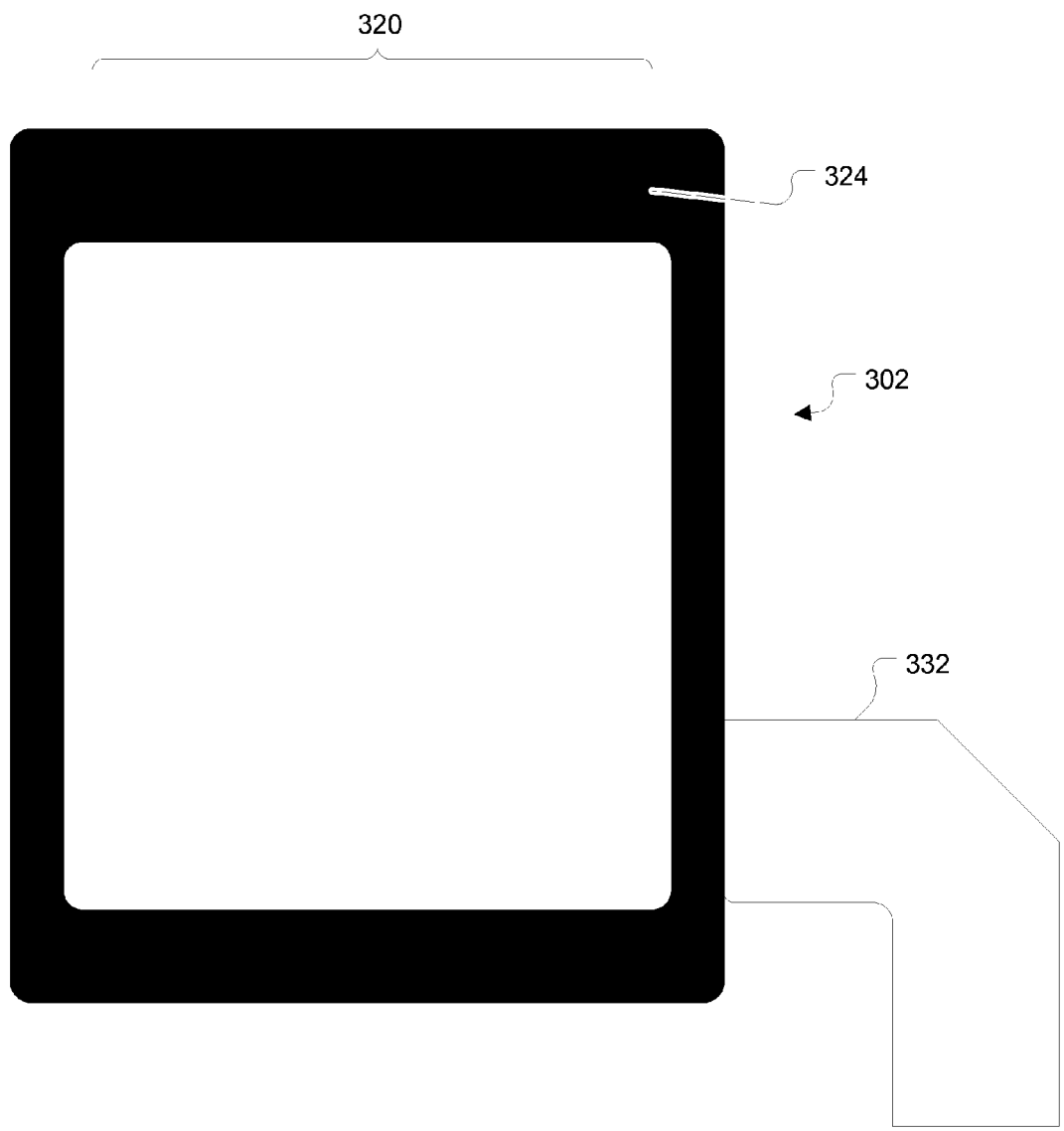
FIG. 3 is a top view of a display having a mask layered thereon and flex section adapted and configured to engage the chip and secure the chip to an interior surface within the device housing.

FIG. 3 is a top view of an interface 320 of a display having a mask 324 layered thereon and flex section 332 adapted and configured to electrically engage the conductor and a suitable integrated circuit (IC), application-specific integrated circuit (ASIC) or chip.

Figures 4A, 4B:
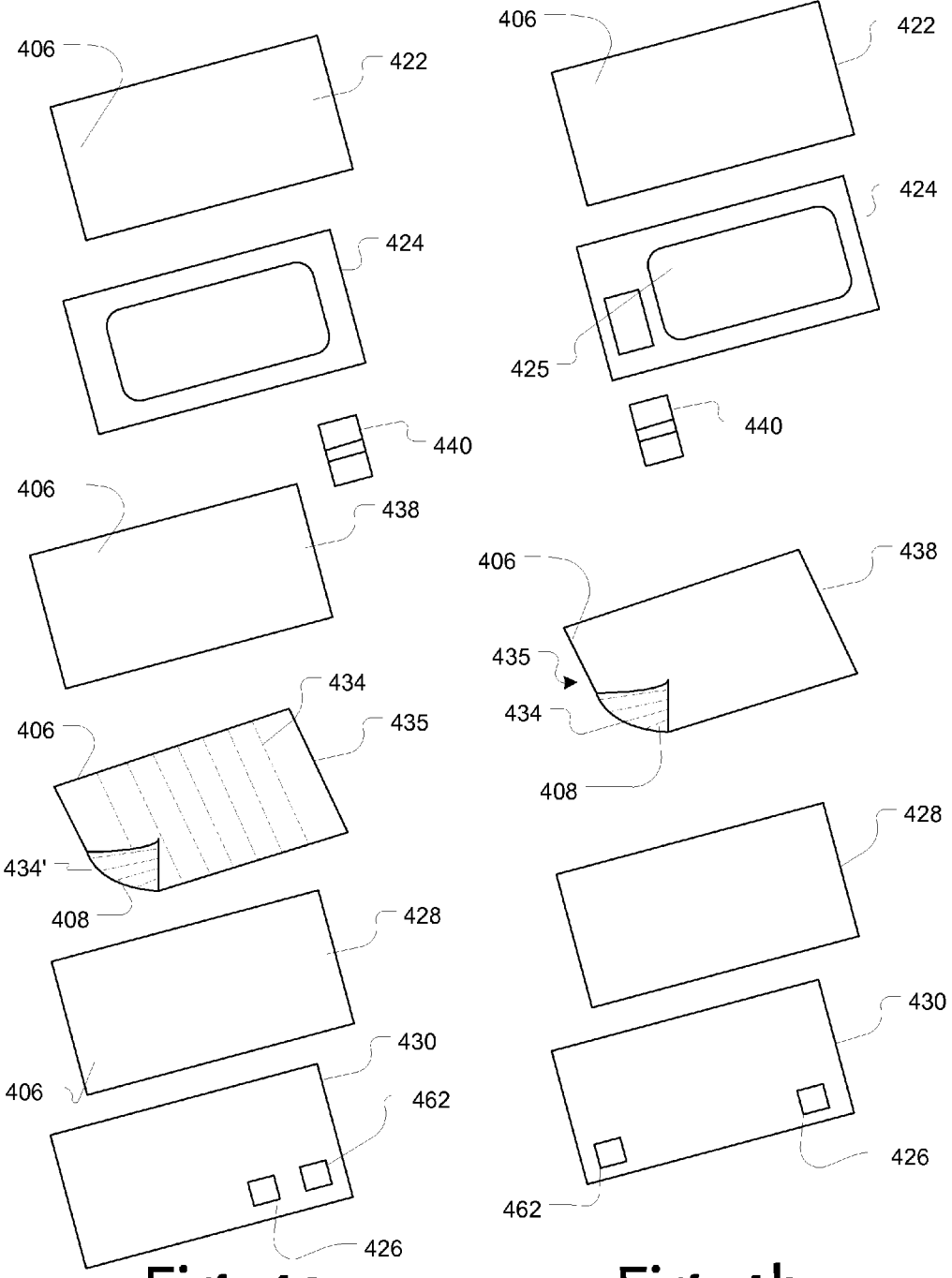
FIGS. 4a-b are exploded views of display devices shown in FIGS. 2a-b.

FIGS. 4a-b are exploded views of display devices shown in FIGS. 2a-b. FIG. 4a has a first layer comprising a PCB layer 430 onto which one or more controllers are affixed. The controller can be one or more integrated circuit chips adapted and configured to control one or more of the devices such as the display and the fingerprint sensor. As shown in FIG. 4a an integrated controller 426 is provided for the touch screen and an integrated circuit 462 is provided for the finger print sensor. The next layer is the display 428 layer. Where the device includes touch screen capability, the next layer is the touch screen layer 435 which, as depicted in this configuration, has a first conductive layer 434 on a first side (upper surface 406) of the touch screen layer, and a second conductive layer 434' on the second surface (lower surface 408) of the touch screen layer. The fingerprint sensor 440 is positioned on the upper surface 406 of the cover lens 438 and may be partially or fully covered by a mask layer 424 which selectively covers the cover lens 438. A protective layer 422 is positioned over the entire assembly.

FIG. 4b again has a first layer comprising a PCB layer 430 onto which one or more controllers are affixed. The controller can be one or more integrated circuit chips adapted and configured to control one more of the display, the touch screen sensor, the fingerprint sensor, etc. As shown in FIG. 4b an integrated controller 426 is provided for the touch screen and an integrated circuit 462 is provided for the finger print sensor. The next layer is the display 428 layer. Where the device includes touch screen capability, the next layer is the touch screen layer 435 which, as depicted in this configuration, has a first conductive layer 434 on the second surface (lower surface 408) and is formed directly on the cover lens. The fingerprint sensor 440 is positioned on the upper surface 406 of the cover lens 438 and may be partially or fully covered by a mask layer 424. The mast 424 can have an aperture 425 over all or a portion of the display corresponding to the fingerprint sensor. A protective layer 422 is positioned over the entire assembly.

Figure 5A:
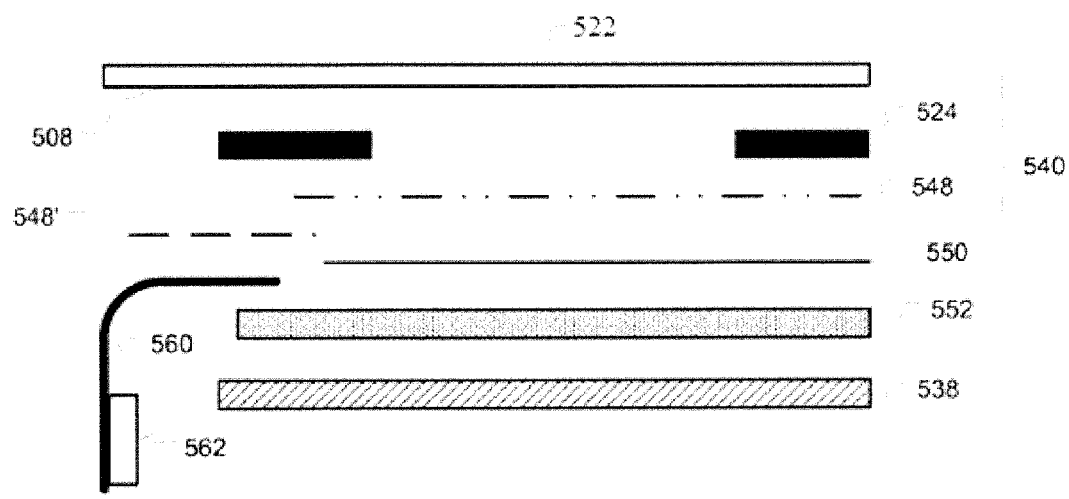
FIG. 5a illustrates layers of a fingerprint sensor having a two layers of conductors on the bottom-side of a film.

FIG. 5a illustrates layers of a fingerprint sensor 540 adaptable and configurable for integration with a display, as described above. The fingerprint sensor 540 is shown in cross-section along the lines 5-5 shown in FIG. 1. The fingerprint sensor 540 has a patterned conductor layer 548. An uppermost layer is a flexible film that functions as a protective layer 522. A suitable film is, for example, polyethylene terephthalate (PET) or any suitable hardened thermoplastic polymer resin, which may also have a hard coat on top. The film has a thickness of less than 50 microns to enable effective operation of the fingerprint sensor 540. A mask 524 is positionable on the bottom surface 508 of the film and may be deposited on the film on the lower (bottom) surface. The mask 524 may be a suitable ink layer. The next layer forms part of the fingerprint sensor 540 and is a conductive layer, typically a transparent conductor or patterned transparent conductor 548. The transparent conductor 548 forms a first metal layer and may be formed from any suitable conductive material including, for example, indium tin oxide (ITO), carbon nanotubes, metal nanowires or fine line metal. A second metal 548' layer can be provided that overlaps at least a portion of the first metal layer 548. The conductive layer 548, 548' is positioned on the bottom (interior facing) side of the film. In some configurations of the fingerprint sensor with display an optical coating layer 550 can be provided to reduce or prevent reflection and to assist in hiding the conductive layer. An adhesive layer 552 adheres the finger print sensor 540 conductive layer 548, the film and the mask to the cover glass 538. The adhesive layer 552 is typically an optically clear adhesive. The second metal layer 548' is flexible and with the film 522 can wrap-around the edge of the cover lens 538. As depicted the second metal layer 548' can be formed in electrical communication to a flex 560 which has a chip 562 mounted thereon. The flex 560 and chip 562 can be provided pre-assembled as a chip-on-flex (COF). By providing a microchip directly mounted on and electrically connected to a flexible circuit, COF can be electrically connected to the second metal layer and then shaped into the device package as needed. However, as will be appreciated by those skilled in the art, other configurations of connecting the chip via a flexible connector can be employed without departing from the scope of the disclosure. In some configurations, the conductor 548 is integrally formed with the touch screen. Additionally, a touch sensor can be positioned as illustrated in FIGS. 2a-b. However, as will be appreciated by those skilled in the art, in some configurations a flexible lead may be used instead of a COF configuration.

Figure 5B:
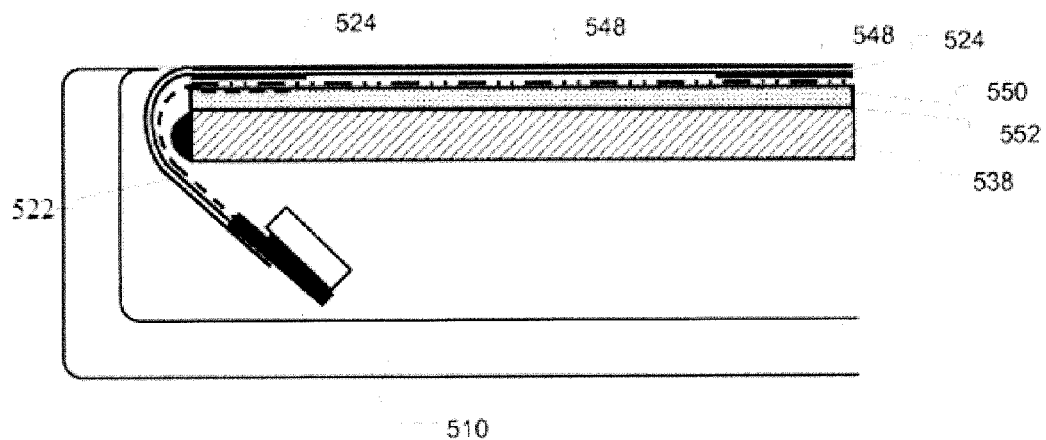
FIG. 5b illustrates the layers of FIG. 5a positioned such that the fingerprint sensor is adjacent a wall of the device housing.

FIG. 5b illustrates the configuration shown in FIG. 5a wherein the film has the mask applied, and has the conductive layer applied. Thereafter the optional second conductive layer is applied. If an optical coating layer is used, then the optical layer can be applied on the film surface or another appropriate surface to enhance optical performance. From that point the lens can be adhered to the optical coating or conductive layer, followed by electrically connecting the COF to the conductive layer. As will be appreciated by those skilled in the art, the step of adhering the lens can be performed before or after the step of attaching the COF. In some configurations, the lens can have a rounded end to facilitate bending the film around the lens for mounting within the device housing. The completed apparatus is then positioned within a device housing 510 adjacent an edge such that the upper surface is flush with upper surface of the housing or is flush with the overall display apparatus as shown in FIG. 2a.

Figure 6A:
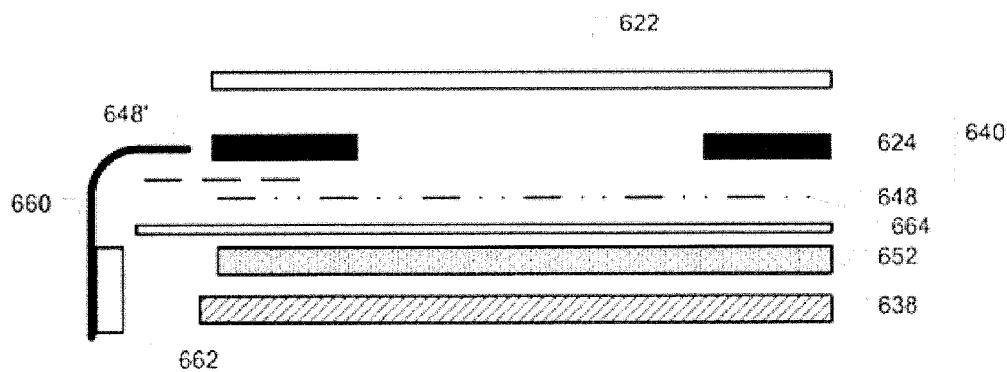
FIG. 6a illustrates layers of a fingerprint sensor having a two layers of conductors on the top-side of a film.

FIG. 6a illustrates a fingerprint sensor 640 having two metal layers on the top side of a film. The first layer is a protective layer such as hard coat 622. The hard coat has a thickness of less than 50 microns to enable effective operation of the fingerprint sensor. A mask 624 is positioned next to or under the bottom surface of the film. The mask 624 may be a suitable ink layer. A first conductive layer 648 is provided next. The conductive layer 648, is typically a transparent conductor or patterned transparent conductor. The transparent conductor 648 forms a first metal layer and may be formed from any suitable conductive material including, for example, indium tin oxide (ITO), carbon nanotubes, or fine line metal. The conductive layer is positioned on the bottom (interior facing) side of the film. A second conductive layer, 648', is formed which connects with the first conductive layer. The second conductive layer can be formed from any suitable transparent conductor, such as copper. A layer of film 664 is adhered to a cover lens 638 of the display by a layer of adhesive 652. The adhesive layer 652 is typically an optically clear adhesive. As depicted the second metal layer 648' can be formed in electrical communication with a flex 660 which has a chip 662 mounted thereon. The flex 660 can be positioned on the upper side of the second metal layer 648'. In some configurations, the conductor 648 is integrally formed with the touch screen sensor.

Figure 6B:
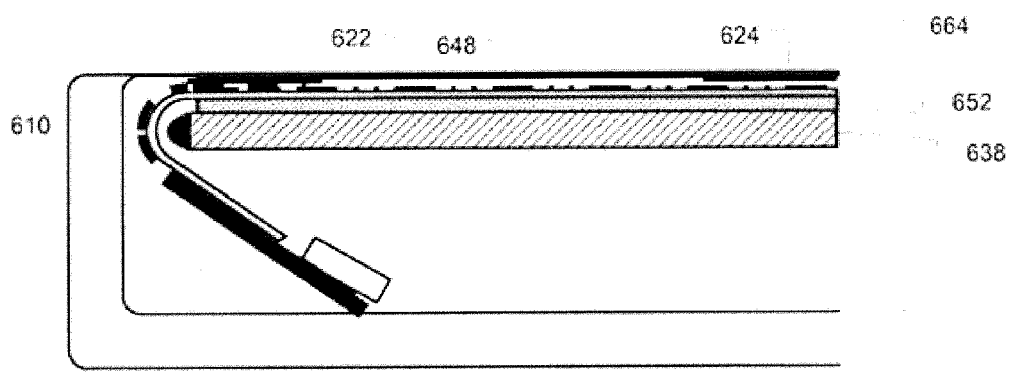
FIG. 6b illustrates the layers of FIG. 6a positioned such that the fingerprint sensor is adjacent a wall of the device housing.

FIG. 6b illustrates the layers of FIG. 6a within a device housing 610. The film 664, flex 660, and chip 662 can be bent around, for example, the cover lens 638 to facilitate positioning the chip within the housing of the device. The cover lens 638 can be provided with a rounded edge in order to facilitate bending the film 664 around the lens. In assembling the components, the conductor is pattered onto the clear plastic film (PET) layer and then the second conductive layer is patterned on top of a portion of the first conductive layer. A mask is then applied and a protective layer is added. Thereafter the cover glass, or lens, of the display can be adhered to the bottom surface of the clear plastic film and the flex can be adhered to the upper surface of the second conductive layer.

Figure 7A:
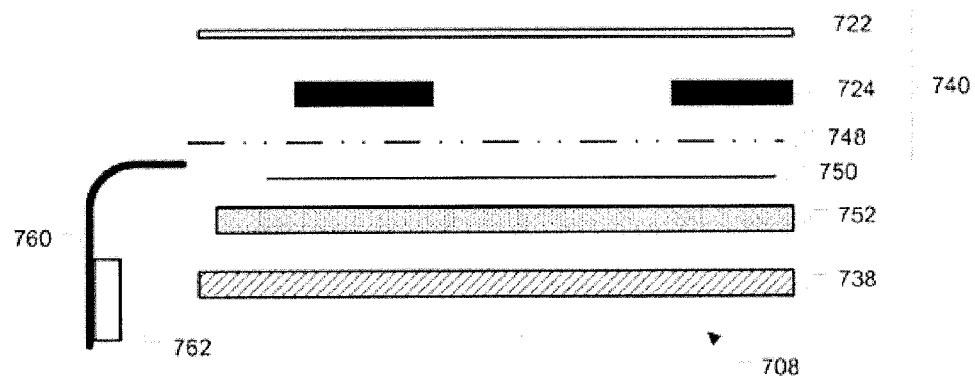
FIG. 7a illustrates layers of a fingerprint sensor having a flexible transparent conductor on the bottom-side of a film.

FIG. 7a illustrates layers of a fingerprint sensor 740 having a flexible transparent conductor on the bottom-side of a film. The first layer is a film such as PET with a hard coat on top 722. The film has a thickness of less than 150 microns to enable effective operation of the fingerprint sensor, and more preferably a thickness of less than 100 microns, and even more preferably less than 50 microns. A mask 724 is positioned next and may be deposited on the film on the surface of the topcoat facing into the device housing and away from the exterior of the device. The mask 724 may be a suitable ink layer. A conductive layer 748 of flexible material capable of being wrapped around a surface, typically a transparent conductor or patterned transparent conductor is provided. The conductive layer 748 may be formed from any suitable flexible conductive material including, for example, carbon nanotubes, metal nanowires, conductive polymers and fine line metal. The conductive layer is positioned on the bottom (interior facing) side of the film. An anti-reflective or index-matching coating 750 may optionally be added onto the cover lens, film, or other appropriate layer. The adhesive layer 752 adheres the film, patterned conductors and ink to the cover glass 738, and is typically an optically clear adhesive. The conductive layer 748 is formed in electrical communication with a flex 760 which has a chip 762 mounted thereon. The flex 760 is positioned on the bottom side of the conductive layer and connects the conductive layer through the flexible circuit to the chip.

Figure 7B:
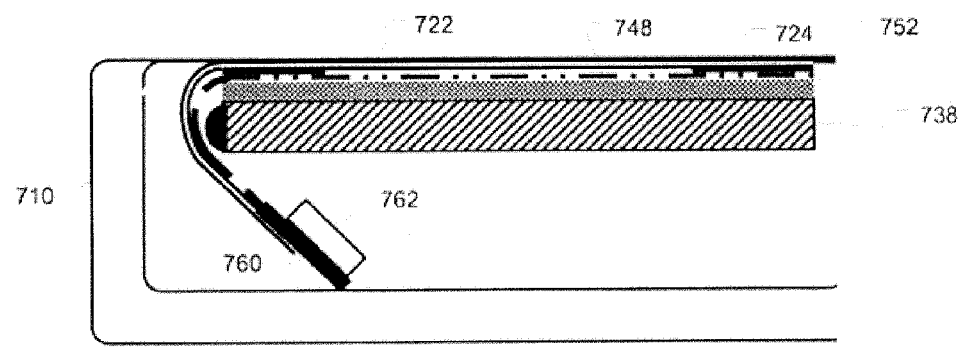
FIG. 7b illustrates the layers of FIG. 7a positioned such that the finger print sensor is adjacent a wall of the device housing.

FIG. 7b illustrates the layers of the sensor 740 of FIG. 7a within a housing 710. In assembling the components, a mask is applied to the film, then the conductor is pattered onto the film and mask layers. Thereafter the cover glass, or lens, of the display can be adhered to the bottom surface of the clear plastic film and the flex can be adhered to the upper surface of the conductive layer.

Figure 8A:
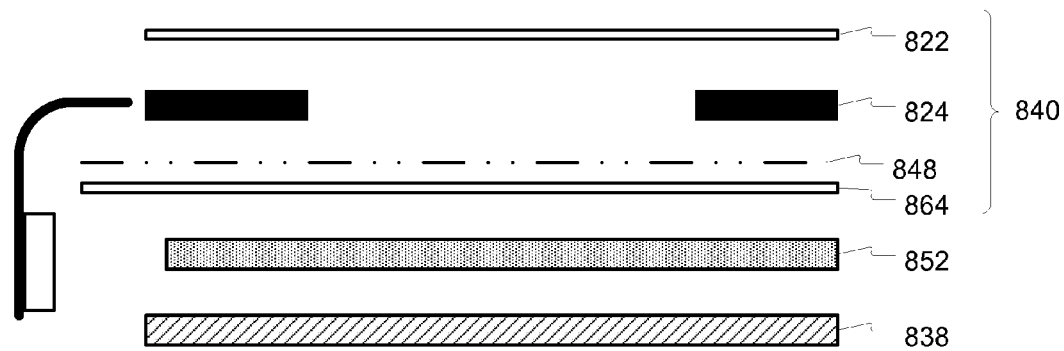
FIG. 8a illustrates layers of a fingerprint sensor having a flexible transparent conductor on the bottom-side of a film.

FIG. 8a illustrates layers of a fingerprint sensor 840 using a flexible transparent conductor on the top-side of a film. A hard coat 822 is provided which is positioned over a mask 824. A patterned conductive layer 848 of flexible material is provided which is in electrical communication with a COF assembly comprising a flex 860 and chip 862. A clear plastic film 864 is also be provided, such as a PET layer, which can be adhered to a cover glass or cover lens 838 via an adhesive 852.

Figure 8B:
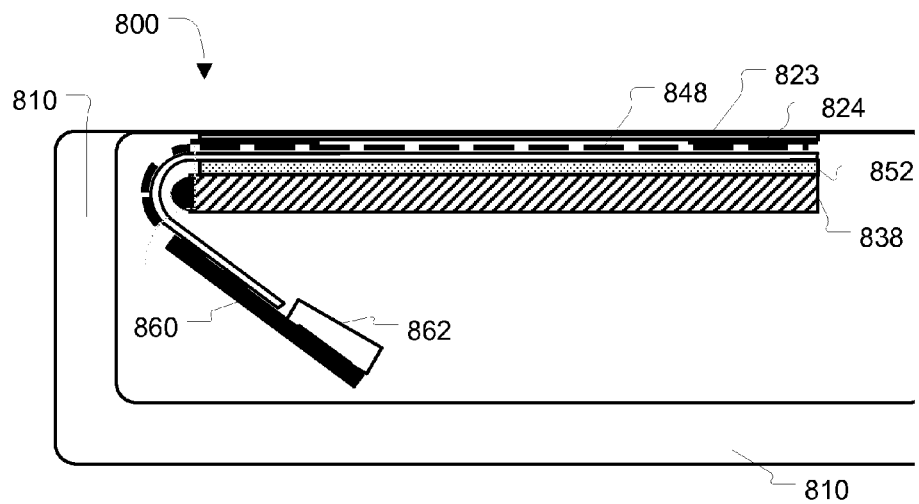
FIG. 8b illustrates the layers of FIG. 8a positioned such that the fingerprint sensor is adjacent a wall of the device housing.

FIG. 8b illustrates the layers the sensor 840 of FIG. 8a within a housing 810. In assembling the components, the conductor is pattered onto the clear plastic film (PET). A mask is then applied and a protective layer or hard coat is added. Thereafter the cover glass, or lens, of the display can be adhered to the bottom surface of the clear plastic film and the flex can be adhered to the upper surface of the conductive layer.

Figure 9A:
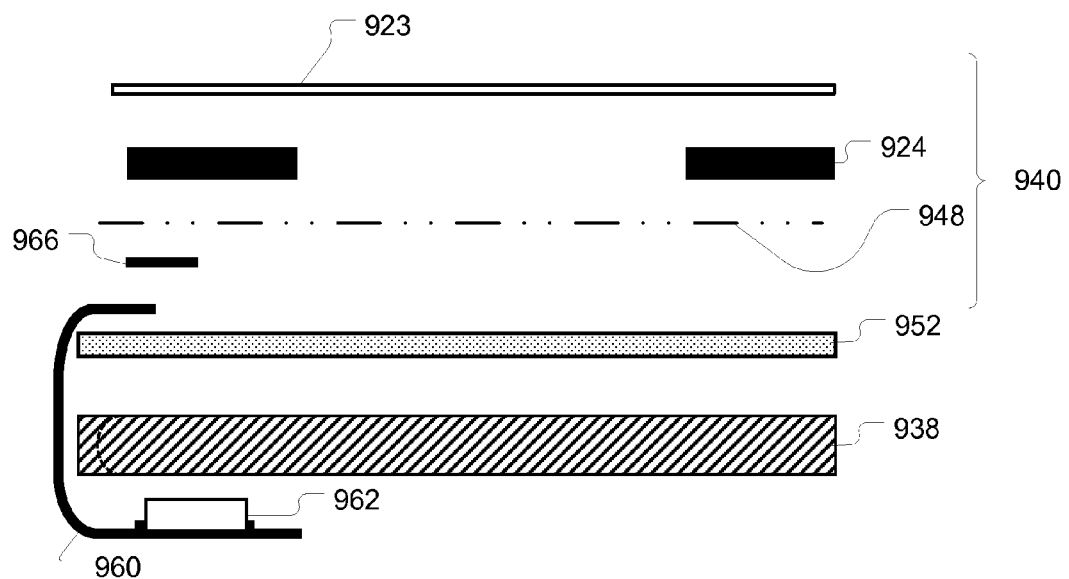
FIG. 9a illustrates layers of a fingerprint sensor using ultrathin glass.

FIG. 9a illustrates layers of a fingerprint sensor 940 suitable for integration with a display. An ultrathin glass layer 923 is provided over a mask 924. A patterned conductive layer 948 of flexible material is then applied. The patterned conductive layer 948 is electrically connected to a flex assembly via an anisotropic conductive film (ACF) 966. The flex assembly includes a flex 960 and a chip 962. In between the patterned conductive layer 948 and the chip 962, a cover lens 938 is positioned which is adhered to the conductive layer via a suitable adhesive 952. The flex assembly is configured to wrap around an end of the cover glass.

Figure 9B:
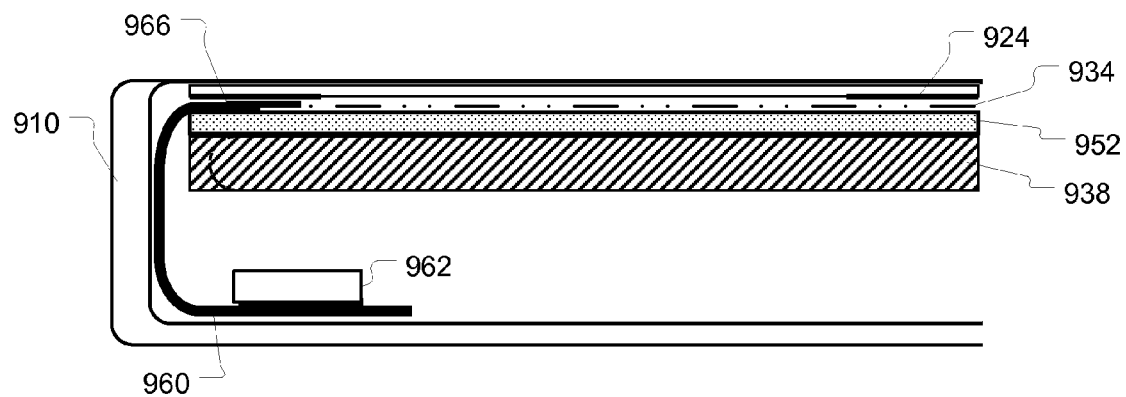
FIG. 9b illustrates the layers of FIG. 9a positioned such that fingerprint sensor is adjacent a wall of the device housing.
Figure 10A:
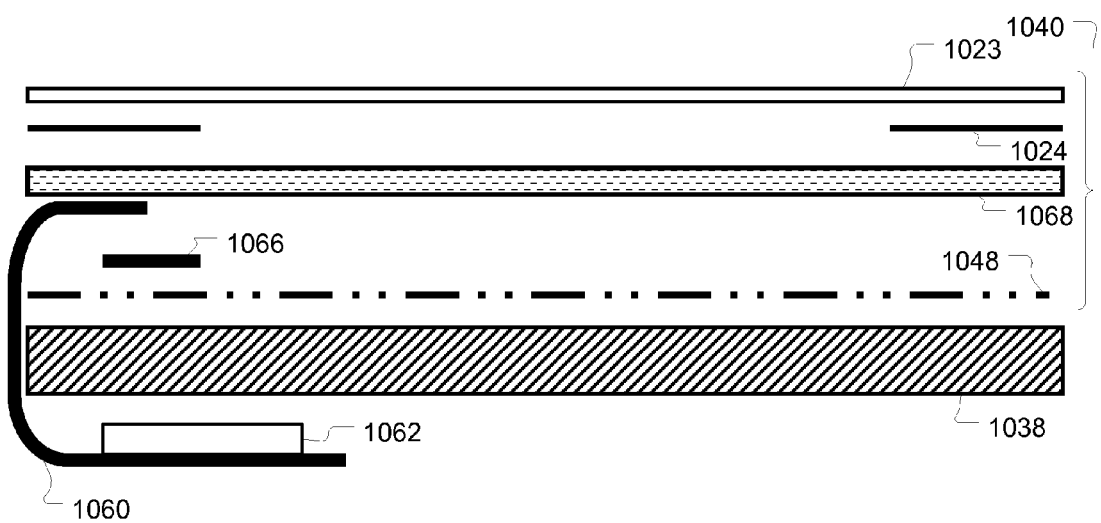
FIG. 10a illustrates layers of a fingerprint sensor using a direct build-up on the cover lens.

FIG. 9b illustrates the layers of the fingerprint sensor shown in FIG. 9a positioned within a housing 910. In assembling the components, a mask is applied to the bottom surface of the ultrathin glass layer. A patterned conductive layer is then applied to the ultrathin glass/mask combination. A anisotropic conductive film is then applied to one end of the layers to which a COF is adhered. The cover glass or lens is then adhered to the patterned conductive layer and the flexible circuit of the COF is wrapped around and end of the lens FIG. 10a illustrates layers of a fingerprint sensor 1040 formed via a direct build-up of patterned conductors on a lens. A hard coating 1023 is provided over a mask 1024. A planarization layer 1068 can also be provided. A flex assembly includes a flex connector 1060 and a chip 1062. An end of the flex assembly is connected to a lens or cover glass 1038, which has been patterned with a conductive layer 1048, via an ACF 1066.

Figure 10B:
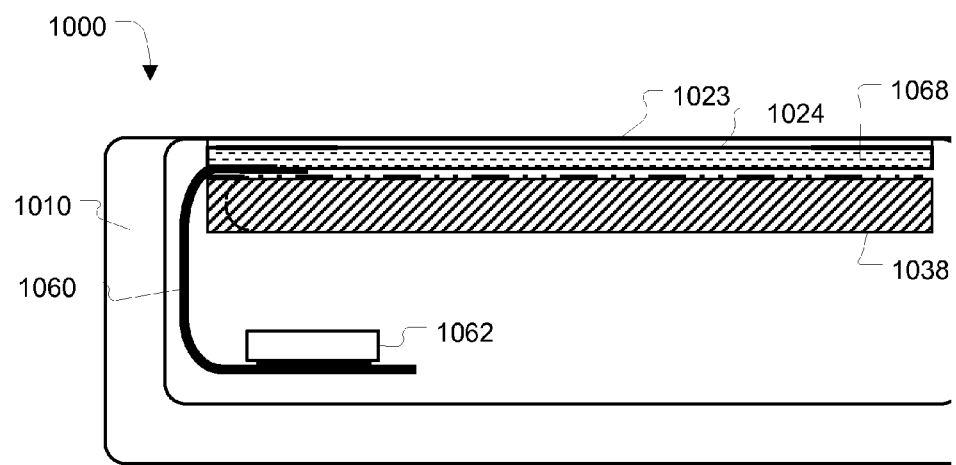
FIG. 10b illustrates the layers of FIG. 10a positioned such that the fingerprint sensor is adjacent a wall of the device housing.

FIG. 10b illustrates the layers of the fingerprint sensor shown in FIG. 10a positioned within a housing 1010. In assembling the components, the lens has a conductive layer patterned onto an upper surface. An ACF is applied at one end of the layer, to which a flexible circuit of a COF is adhered. A planarization layer can then be applied to the upper surface, followed by a mask layer, and a protective hard coating. The flexible circuit of the COF is wrapped around the lens to facilitate positioning the circuit below the lens within the device housing.

Figure 11:
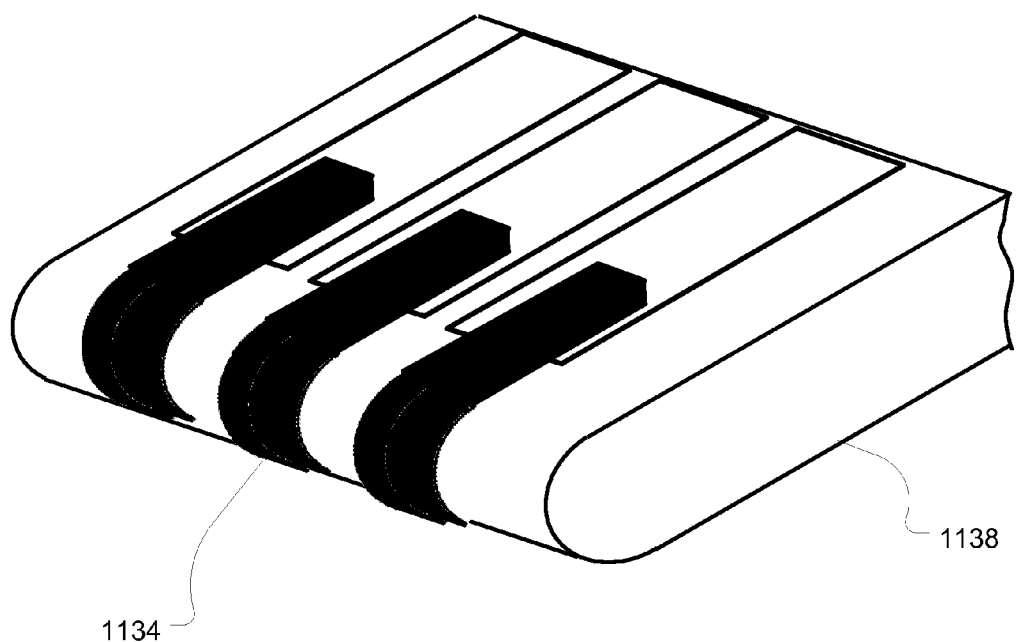
FIG. 11 illustrates a portion of a display which uses metal leads printed to wrap-around the edge of the cover lens.

FIG. 11 illustrates a portion of a display which uses conductive leads 1134, such as metal leads, printed to wrap-around a lens 1148 of a display.

Figure 12A:
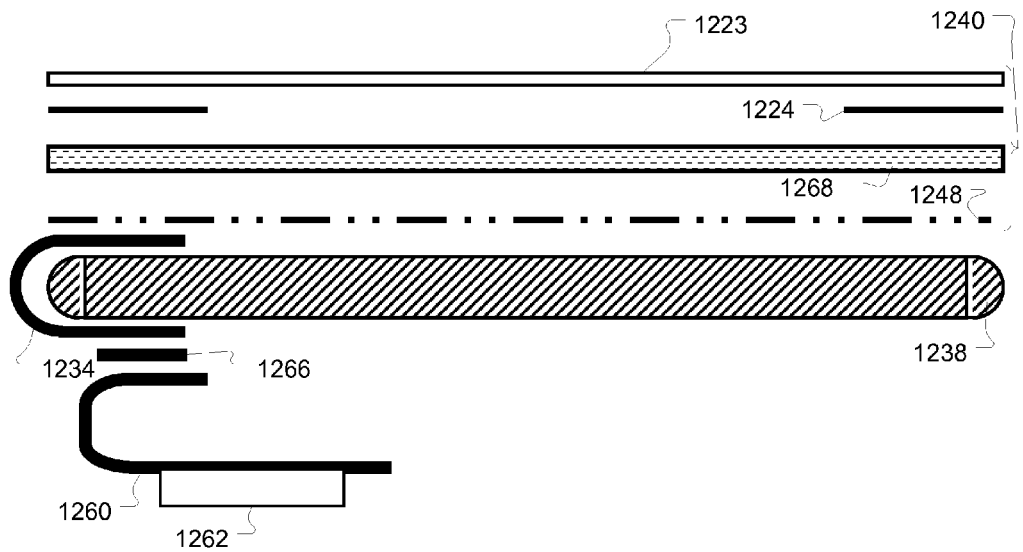
FIG. 12a illustrates the use of wrap-around leads in a direct build-up approach.
Figure 12B:
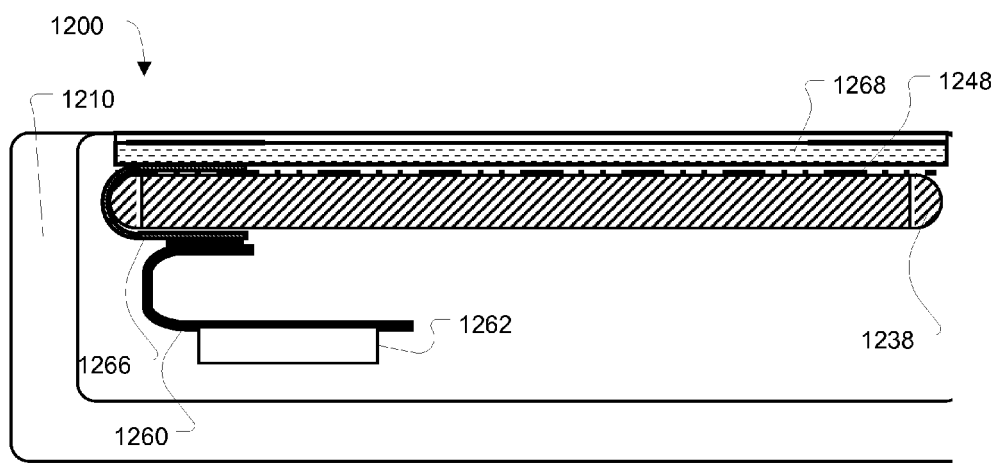
FIG. 12b illustrates the layers of FIG. 12a positioned such that the fingerprint sensor is adjacent a wall of the device housing.

FIG. 12a illustrates the use of wrap-around leads in a direct build-up approach of a fingerprint sensor 1240. A protective layer such as hard coating 1223 is positioned over a mask 1224. A planarization layer 1268 can also be provided which is positioned over a patterned conductive layer 1248. The cover lens 1238 has a conductive lead 1234 wrapped around an end which engages a flex 1260 having a chip 1262 via an ACF 1266. FIG. 12b illustrates the layers of FIG. 12a within a housing 1210.

Figure 13A:
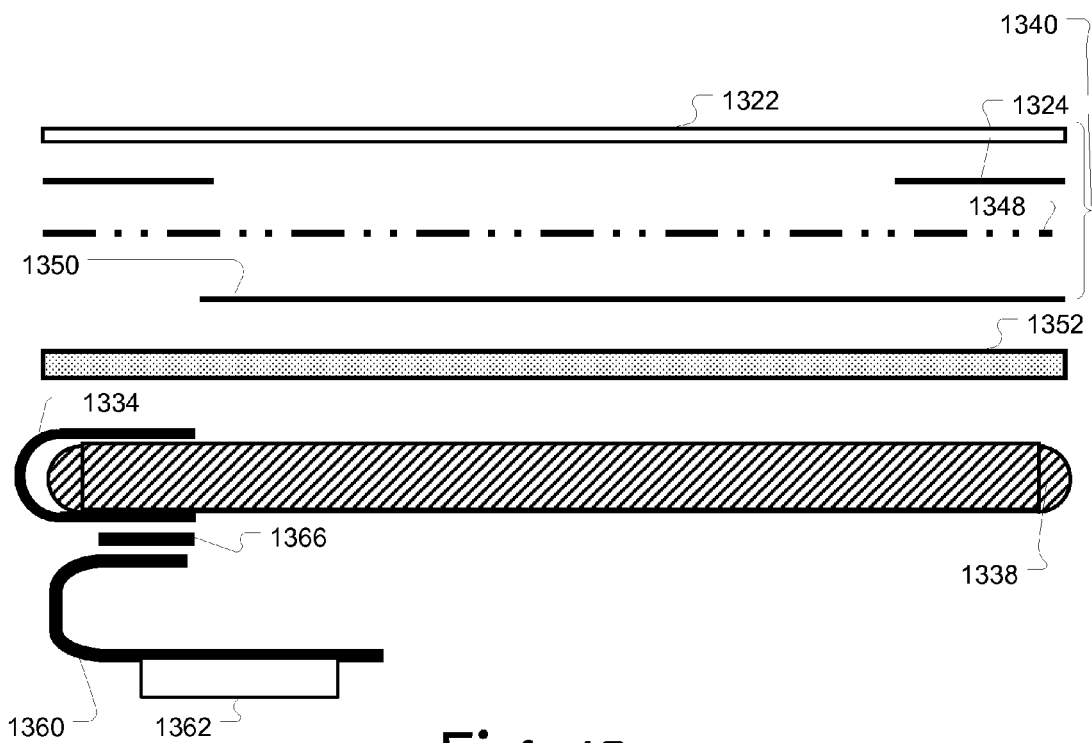
FIG. 13a illustrates the use of wrap-around leads in an ultrathin glass approach.
Figure 13B:
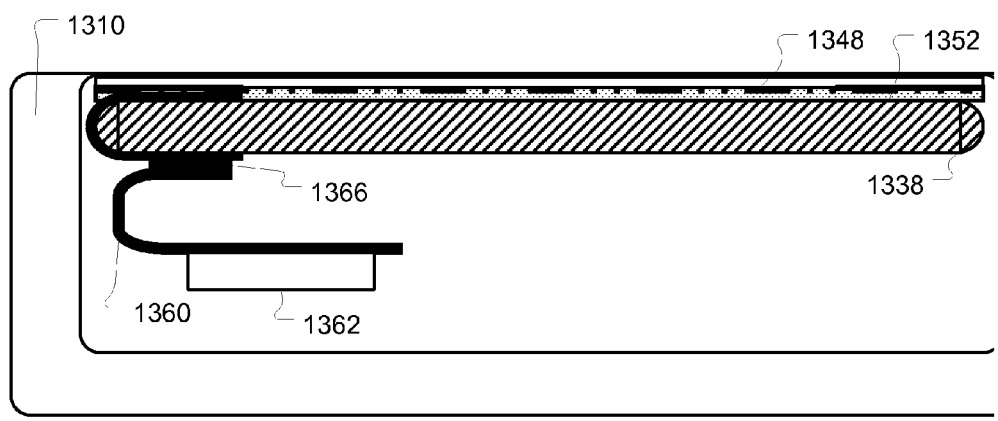
FIG. 13b illustrates the layers of FIG. 13a positioned such that the fingerprint sensor is adjacent a wall of the device housing.
Figure 14:
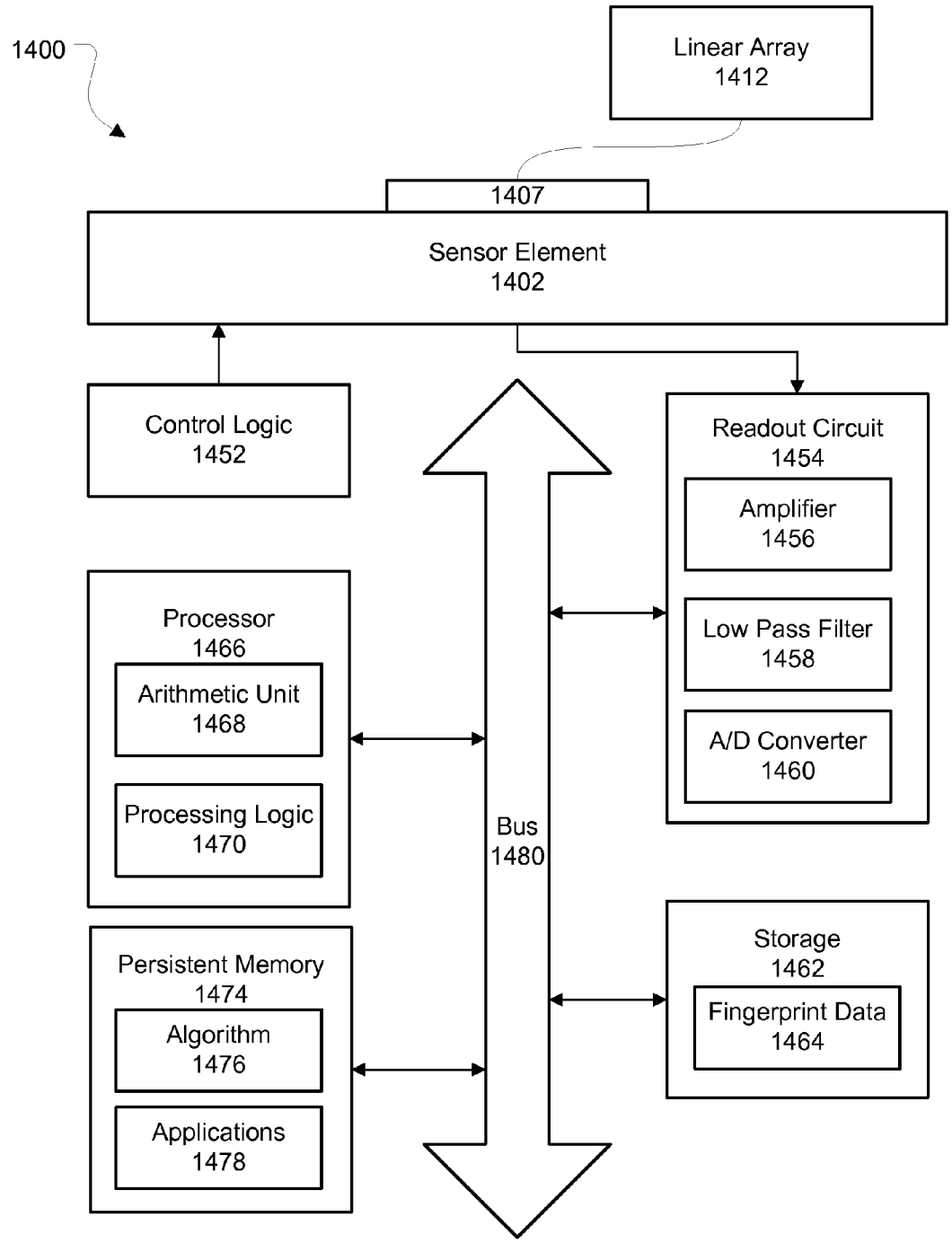
FIG. 14 illustrates a sensing device configured for use with a display device.

FIG. 13a illustrates the use of wrap-around leads in an ultrathin glass approach of a fingerprint sensor 1340. A protective layer such as ultrathin glass 1322 is provided which covers a mask 1324. A patterned conductive layer 1348 is positioned over an optional optical coat 1350. A cover lens 1338 of a display is provided which has a wrap around lead printed thereof. The lens can be adhered to the optical coat 1350 (if present), the patterned conductive layer, the mask and the ultrathin glass via an adhesive 1352. A flex 1360 having a chip 1362 can be connected to the wrap around leads of the cover glass or lens via an ACF 1366. FIG. 13b illustrates the layers of FIG. 13a within a housing.

FIG. 13a illustrates the use of wraparound leads in an ultrathin glass approach of a fingerprint sensor 1340. A protective layer such as ultrathin glass 1322 is provided which covers a mask 1324. A patterned conductive layer 1348 is positioned over an optional optical coat 1350. A cover lens 1338 of a display is provided which has a wraparound lead printed thereof. The lens can be adhered to the optical coat 1350 (if present), the patterned conductive layer, the mask and the ultrathin glass via an adhesive 1352. A flex 1360 having a chip 1362 can be connected to the wrap around leads of the cover glass or lens via an ACF 1366. FIG. 13b illustrates the layers of FIG. 13a within a housing. The disclosed fingerprint sensors may include a fingerprint image sensor, which may include in conductive layers 548, 648, 748, 848, 948, 1048, 1248 and 1348, as shown in FIGS. 5*a-b*-10*a-b*, and 12*a-b* and 13*a-b*, and an array of capacitive sensors for capacitive sensing of ridge peaks and ridge valleys of a fingerprint on a swiped finger. The image sensors 548, 648, 748, 848, 948, 1048, 1248 and 1348 may include a linear array of capacitive sensors for capacitive sensing of ridge peaks and ridge valleys of a fingerprint. The image sensors may also include at least one image pickup trace and at least one image drive traces in spaced relation to the at least one image pickup plate to each define respectively one of a plurality of sensor gaps/image pixel locations, between a respective image drive plate and a respective image pickup plate. The ridge peaks and ridge valleys of the fingerprint over the sensor gaps/image pixel locations can produce a change in capacitance between the respective image drive trace and the respective image pickup trace. The conductive elements/traces may thus create a capacitive sensing array for detecting topographic variations in an object, such as a finger. The array may include multiple drive traces which can be sequentially excited with short duration electronic waveform bursts. A pickup plate connected to a charge sensing circuit can sequentially detect/receive the intensity of the electric field created by a respective drive trace. With each complete scan of the pixel locations formed by the drive/pickup trace gaps a two-dimensional image based on variation of capacitance across the respective gaps can be generated, including a resemblance of features of the physical surface of the object. In some embodiments, the sensor drive traces can comprise parallel traces/conductors disposed perpendicular to a single image pickup trace and spaced from the image pickup trace by respective sensor gaps. In some embodiments, two or more image pickup traces can be utilized. The image pickup trace(s) and the image drive trace(s) may be substantially coplanar in the sensor conductive layers 548, 648, 748, 848, 948, 1048, 1248 and 1348. Features of the finger passing above the sensor gaps so created in the sensor conducive layers 548, 648, 748, 848, 948, 1048, 1248 and 1348 can produce changes in capacitance between each respective image drive trace(s) and a respective image pickup trace(s). The image sensing apparatus, e.g., a controller IC 562, 662, 762, 862, 962, 1062, 1262 and 1362, may further comprise an excitation circuit for sequentially energizing the respective image drive trace(s) with image drive signals and a detection circuit for detecting the drive signals capacitively coupled, i.e., received from the respective image drive trace(s) by the respective image pickup trace(s), across the respective gap, to provide image signals. Therefore the conductive layers 548, 648, 748, 848, 948, 1048, 1248 and 1348 can form capacitive gap sensor arrays for detecting topographic variations of an object over the array. The sensor arrays having the described sensor gaps, i.e., sensor apertures can sense topographic variations in the object, e.g., over or passing over the respective sensor gap/aperture, because the capacitance of the capacitive gap/aperture changes and can be measured to reconstruct an image of the biometric being sensed.

Sensing device 1400 further includes a readout circuit 1454 for reading analog output signals from sensor element 1402 when it is subject to a fingerprint juxtaposed on a sensor surface 1407. Readout circuit 1454 includes an amplifier 1456 configured to amplify the analog signal so that it can more accurately be read in subsequent operations. A low pass filter 1458 is configured to filter out any noise from the analog signal so that the analog signal can be more efficiently processed. Readout circuit 1454 further includes an analog-to-digital (A/D) converter 1460 that is configured to convert the output signal from sensor element 1402 to a digital signal that indicates a series of logic 0's and 1's that define the sensing of the fingerprint features by the pixels or data contact points of sensor surface 1407. Such signals may be separately received by the motion sensors and the fingerprint sensing surfaces, and may be read out and processed separately.

Readout circuit 1454 may store the output signal in a storage 1462, where fingerprint data 1464 is stored and preserved, either temporarily until a processor 1466 can process the signal, or for later use by the processor. Processor 1466 includes an arithmetic unit 1468 configured to process algorithms used for navigation of a cursor, and for reconstruction of fingerprints. Processing logic 1470 is configured to process information and includes analog to digital converters, amplifiers, signal filters, logic gates (all not shown) and other logic utilized by a processor. A persistent memory 1474 is used to store algorithms 1476 and software applications 1478 that are used by processor 1466 for the various functions described above, and in more detail below. A system bus 1480 is a data bus configured to enable communication among the various components contained in sensing device 1400. As will be appreciated by those skilled in the art, memory and storage can be any suitable computer readable media.

The system further includes a controller communicating with the fingerprint sensor lines to capture a fingerprint image when a user's fingerprint is swiped about the fingerprint sensor lines. In one system, there may be separate controllers for both the display and the fingerprint sensor, where the system is configured to include a display controller configured to control the visible display separate from the fingerprint sensor operations. Alternatively, a single controller may be used to control, for example, the visible display and the fingerprint sensor operations. The fingerprint sensor could also be patterned onto the top glass of the display itself, and not onto a touch-screen layer.

Figure 15:
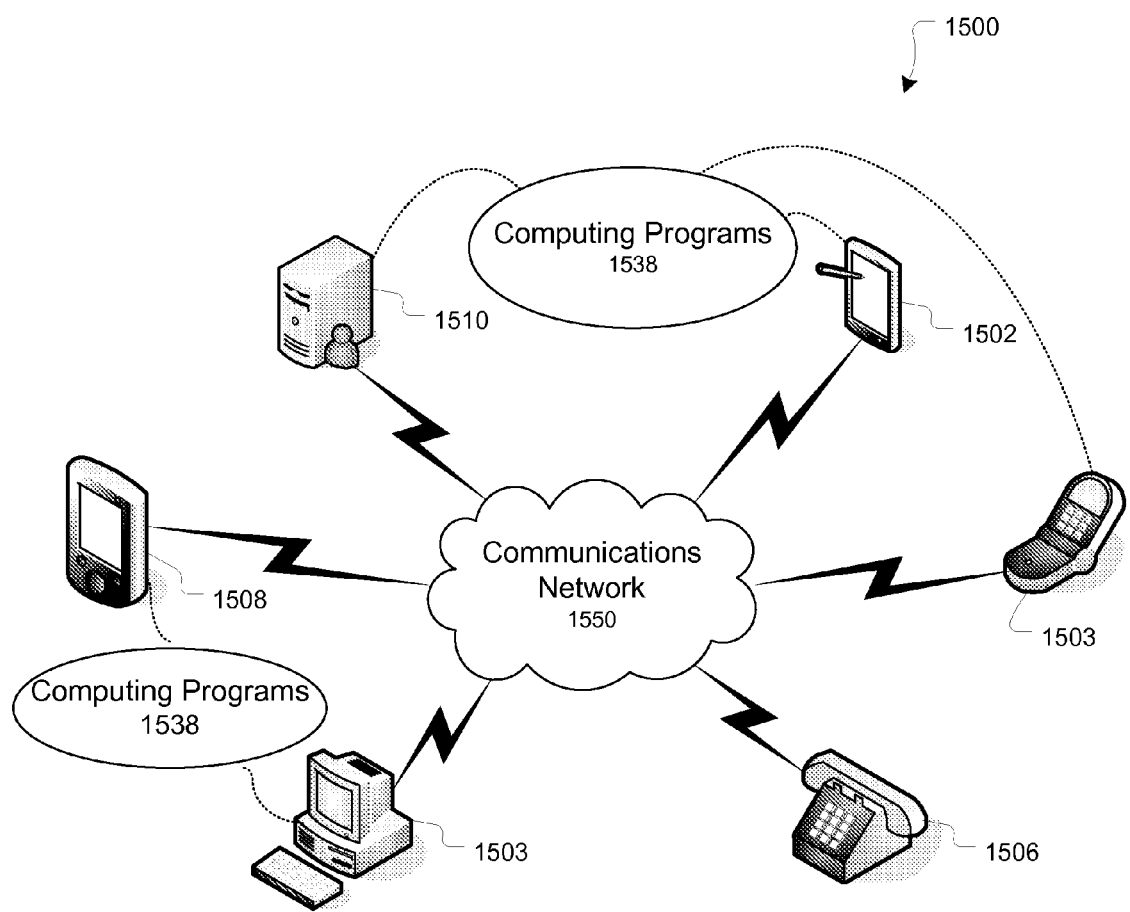
FIG. 15 illustrates the use of a device according to the disclosure within a communication network.

FIG. 15 illustrates the use of a fingerprint sensor according to the disclosure within a communication network. As will be appreciated by those skilled in the art, the present disclosure may also involve a number of functions to be performed by a computer processor, such as a microprocessor, and within a communications network. The microprocessor may be a specialized or dedicated microprocessor that is configured to perform particular tasks according to the disclosure, by executing machine-readable software code that defines the particular tasks embodied by the disclosure. The microprocessor may also be configured to operate and communicate with other devices such as direct memory access modules, memory storage devices, Internet related hardware, and other devices that relate to the transmission of data in accordance with the disclosure. The software code may be configured using software formats such as Java, C++, XML (Extensible Mark-up Language) and other languages that may be used to define functions that relate to operations of devices required to carry out the functional operations related to the disclosure. The code may be written in different forms and styles, many of which are known to those skilled in the art. Different code formats, code configurations, styles and forms of software programs and other means of configuring code to define the operations of a microprocessor in accordance with the disclosure will not depart from the spirit and scope of the disclosure.

Within the different types of devices, such as laptop or desktop computers, hand held devices with processors or processing logic, and also possibly computer servers or other devices that utilize the disclosure, there exist different types of memory devices for storing and retrieving information while performing functions according to the disclosure. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the disclosure when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the disclosure as described herein enable the physical transformation of these memory devices. Accordingly, the disclosure as described herein is directed to novel and useful systems and methods that, in one or more embodiments, are able to transform the memory device into a different state. The disclosure is not limited to any particular type of memory device, or any commonly used protocol for storing and retrieving information to and from these memory devices, respectively.

A single medium or multiple media (e.g., a centralized or distributed database, and/or associated caches and servers) that store one or more sets of instructions can be used. Any medium, such as computer readable media, that is capable of storing, encoding or carrying a set of instructions for execution by a machine and that causes the machine to perform any one or more of the methodologies of the disclosure is suitable for use herein. The machine-readable medium, or computer readable media, also includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines. Moreover, the computer readable media can be positioned anywhere within the network.

FIG. 15 illustrates an exemplary illustrative networked computing environment 1500, with a server in communication with client computers via a communications network 1550. As shown in FIG. 15, server 1510 may be interconnected via a communications network 1550 (which may be either of, or a combination of a fixed-wire or wireless LAN, WAN, intranet, extranet, peer-to-peer network, virtual private network, the Internet, or other communications network) with a number of client computing environments such as tablet personal computer 1502, mobile telephone, smart phone 1504, telephone 1506, personal computer 1503, and personal digital assistant 1608. In a network environment in which the communications network 1550 is the Internet, for example, server 1510 can be dedicated computing environment servers operable to process and communicate data to and from client computing environments via any of a number of known protocols, such as, hypertext transfer protocol (HTTP), file transfer protocol (FTP), simple object access protocol (SOAP), or wireless application protocol (WAP). Other wireless protocols can be used without departing from the scope of the disclosure, including, for example Wireless Markup Language (WML), DoCoMo i-mode (used, for example, in Japan) and XHTML Basic. Additionally, networked computing environment 1600 can utilize various data security protocols such as secured socket layer (SSL) or pretty good privacy (PGP). Each client computing environment can be equipped with operating system 1538 operable to support one or more computing applications, such as a web browser (not shown), or other graphical user interface (not shown), or a mobile desktop environment (not shown) to gain access to server computing environment 1500.

As will be appreciated by those skilled in the art, any of the devices within the communication network 1550 that have a display (e.g., computer 1501, smart phone 1508, and PDA 1508) can be configured to acquire data from a fingerprint sensor, as described above. Additionally information from the fingerprint sensors can then be transmitted to other devices within the network to facilitate authentication of a user within a network environment regardless of whether the receiving device had a display.

The devices disclosed herein can be used as part of a communication network to provide a mechanism for authenticating biometric information. For example, biometric information can be sensed that is associated with a user; the sensed information can then be compared with a biometric template associated with the user; if the biometric information matches the biometric template, credentials associated with the user can be received based on the biometric information. Additionally, credentials can be communicated, for example, to a requesting process. In another process, a biometric device installed in a client device with a web-enabled application can be identified. Thereafter biometric information associated with a user is identified whereupon a biometric template associated with the biometric information of the user is created. The system can be configured to receive user credentials associated with the user and to bind the user credentials with the biometric template. A web browser application can also be provided that is executable on the devices disclosed which includes a biometric extension configured to communication with the sensors disclosed via, for example, a biometric service and one or more web servers. Tokens can also be used to identify a valid user activation as part of the operation of the disclosed devices.

The use of integratable sensors facilitates the use of, for example, a web browser application that is configured on a client device and configured to be executed by a client processor on the device to facilitate conducting a secure transaction, such as a financial transaction, remotely which is authenticated based on information acquired by an integratable sensor such as those disclosed.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system, comprising:
   a cover glass;
   a fingerprint sensor formed of direct build-up patterned conductors disposed on the cover glass, wherein the direct build-up patterned conductors are passive traces forming an image sensing array of capacitively coupled drive elements and pick up elements;
   a flexible connector connected to the patterned conductors;
   a chip mounted on the flexible connector, the chip being configured to control the fingerprint sensor, wherein the chip comprises an excitation circuit for energizing the drive elements and a detection circuit for detecting corresponding signals received from the pickup elements; and
   a display module below the cover glass, the display module being configured to produce a visible display.

2. The system of claim 1, wherein the cover glass is formed from a chemically hardened glass.

3. The system of claim 1, further comprising:
   a touch sensor below the cover glass.

4. The system of claim 3, wherein the fingerprint sensor is positioned such that it overlays a portion of the touch sensor.

5. The system of claim 1, further comprising:
   a protective layer positioned over the cover glass and the fingerprint sensor.

6. The system of claim 5, wherein the protective layer is a protective glass layer.

7. The system of claim 5, wherein the protective layer is a flexible film.

8. The system of claim 1, wherein the fingerprint sensor is positioned on an upper surface of the cover glass.

9. The system of claim 1, wherein the fingerprint sensor is formed of transparent patterned conductors.

10. The system of claim 1, wherein the fingerprint sensor is fully or partially covered by a mask layer.

11. The system of claim 1, wherein the display module comprises a glass layer.

12. The system of claim 1, wherein the flexible connector and the chip form a chip-on-flex (COF) structure.

13. The system of claim 1, further comprising:
    a touch sensor, wherein the chip is further configured to control the touch sensor and the display module.

14. The system of claim 1, wherein the chip is positioned below the cover glass.

15. The system of claim 1, wherein the flexible connector is attached at an upper surface of the cover glass, and the flexible connector is wrapped around the cover glass to position the chip below the cover glass.

16. The system of claim 1, wherein the flexible connector is attached at a lower surface of the cover glass, and the chip is positioned below the cover glass.

17. A system comprising:
    a cover glass configured to protect a display module below the cover glass, the display module being configured to produce a visible display;
    a fingerprint sensor formed of direct build-up patterned conductors disposed on the cover glass, wherein the direct build-up patterned conductors are passive traces forming an image sensing array of capacitively coupled drive elements and pick up elements; and
    a chip, connected to the fingerprint sensor, the chip being configured to control the fingerprint sensor, wherein the chip comprises an excitation circuit for energizing the drive elements and a detection circuit for detecting corresponding signals received from the pickup elements.

18. The system of claim 17, wherein the cover glass is formed from a chemically hardened glass.

19. The system of claim 17, further comprising:
    a protective layer positioned over the cover glass and the fingerprint sensor.

20. The system of claim 19, wherein the protective layer is a protective glass layer.

21. The system of claim 19, wherein the protective layer is a flexible film.

22. The system of claim 17, wherein the fingerprint sensor is positioned on an upper surface of the cover glass.

23. The system of claim 17, wherein the fingerprint sensor is formed of transparent patterned conductors.

24. The system of claim 17, further comprising:
    a flexible connector connected to the patterned conductors; and
    wherein the chip is mounted on the flexible connector.

25. The system of claim 24, wherein the flexible connector and the chip form a chip-on-flex (COF) structure.

26. The system of claim 24, wherein the chip is positioned below the cover glass.

27. The system of claim 24, wherein the flexible connector is attached at an upper surface of the cover glass, and the flexible connector is wrapped around the cover glass to position the chip below the cover glass.

28. The system of claim 24, wherein the flexible connector is attached at a lower surface of the cover glass, and the chip is positioned below the cover glass.

29. The system of claim 17, further comprising:
    a touch sensor below the cover glass.

30. The system of claim 29, wherein the fingerprint sensor is positioned such that it overlays a portion of the touch sensor.

31. A system, comprising:
    a cover glass;
    a fingerprint sensor, comprising direct build-up patterned conductors disposed on the cover glass, wherein the direct build-up patterned conductors are passive traces forming an image sensing array of capacitively coupled drive elements and pick up elements;
    a chip, connected to the fingerprint sensor, the chip being configured to control the fingerprint sensor, wherein the chip comprises an excitation circuit for energizing the drive elements and a detection circuit for detecting corresponding signals received from the pickup elements;
    a touch sensor below the cover glass; and
    a display module below the cover glass, the display module being configured to produce a visible display.

* * * * *